United States Patent
Nakano et al.

(10) Patent No.: US 8,324,768 B2
(45) Date of Patent: Dec. 4, 2012

(54) ROTATIONAL ANGLE DETECTION DEVICE AND METHOD FOR PERMANENT MAGNET DYNAMO-ELECTRIC MACHINE AND ELECTRIC POWER STEERING DEVICE

(75) Inventors: Masatsugu Nakano, Tokyo (JP); Akira Satake, Tokyo (JP); Kanji Shinkawa, Tokyo (JP); Hiroyuki Akita, Tokyo (JP); Sachiko Kawasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 12/351,244

(22) Filed: Jan. 9, 2009

(65) Prior Publication Data
US 2009/0184598 A1    Jul. 23, 2009

(30) Foreign Application Priority Data

Jan. 11, 2008   (JP) .................................. 2008-004336
Dec. 19, 2008   (JP) .................................. 2008-323833

(51) Int. Cl.
*H02K 29/06* (2006.01)
*H02K 1/27* (2006.01)
*H02K 29/08* (2006.01)
*H02K 21/04* (2006.01)
*H02K 21/14* (2006.01)

(52) U.S. Cl. ............ 310/68 B; 310/156.06; 310/156.74; 310/181

(58) Field of Classification Search ................. 310/68 B, 310/181, 156.06, 156.74, 156.76, 156.77, 310/156.78, 156.81; *H02K 29/06, 29/08, H02K 21/04, 21/14, 1/27*
See application file for complete search history.

(56) References Cited

U.S. PATENT DOCUMENTS

| | | | | |
|---|---|---|---|---|
| 4,888,509 A * | 12/1989 | Tomasek | ...................... | 310/68 B |
| 6,093,986 A * | 7/2000 | Windhorn | .................... | 310/68 B |
| 6,664,688 B2 * | 12/2003 | Naito et al. | .............. | 310/156.01 |
| 6,788,013 B2 * | 9/2004 | Islam et al. | .............. | 310/156.74 |

(Continued)

FOREIGN PATENT DOCUMENTS

JP           63-20105         4/1988

(Continued)

OTHER PUBLICATIONS

U.S. Appl. No. 12/391,573, filed Feb. 24, 2009, Nakano, et al.

(Continued)

*Primary Examiner* — Quyen Leung
*Assistant Examiner* — Michael Andrews
(74) *Attorney, Agent, or Firm* — Oblon, Spivak, McClelland, Maier & Neustadt, L.L.P.

(57) ABSTRACT

A rotational angle detection device for a permanent magnet dynamo-electric machine, including: a stator (10); a rotor (20); and a conductive circuit that includes first conductors (1*a*1, 1*a*2) extending in a direction parallel to a rotational axis of the rotor and being disposed in at least two places in a circumferential direction of the rotor, and second conductors (1*b*1, 1*b*2) for electrically interconnecting the first conductors. In this case, the first conductors are each disposed within a range of an electrical angle between −45° and +45° in the circumferential direction with a magnetic pole center being set as a reference, and the conductive circuit is disposed in at least one place in the circumferential direction, and the rotational angle detection device further comprising a detection means for detecting a rotational angle of the rotor by measuring a value of a current flowing through the armature winding.

19 Claims, 27 Drawing Sheets

U.S. PATENT DOCUMENTS

| | | | |
|---|---|---|---|
| 6,847,143 B1* | 1/2005 | Akemakou | 310/156.43 |
| 7,414,343 B2* | 8/2008 | Arita et al. | 310/181 |
| 2004/0155537 A1* | 8/2004 | Nakano et al. | 310/51 |

FOREIGN PATENT DOCUMENTS

| | | |
|---|---|---|
| JP | 9-294391 | 11/1997 |
| JP | 2001-204163 | 7/2001 |
| JP | 2005-065415 | 3/2005 |
| JP | 2005-168127 | 6/2005 |
| JP | 2006-109663 | 4/2006 |

OTHER PUBLICATIONS

U.S. Appl. No. 12/994,772, filed Nov. 26, 2010, Nakano, et al.

Thomas A. Nondahl, et al., "A Permanent-Magnet Rotor Containing an Electrical Winding to Improve Detection of Rotor Angular Position", IEEE Transaction on Industry Applications, vol. 35, No. 4, Aug. 1, 1999, pp. 819-824.

Hamid A. Toliyat et al., "Position-Sensorless Control of Surface-Mount Permanent-Magnet AC (PMAC) Motors at Low Speeds", IEEE Transactions on Industrial Electronics, vol. 49, No. 1, Feb. 1, 2002, pp. 157-164.

Thomas A. Nondahl, et al., "A Permanent Magnet Rotor Containing an Electrical Winding to Improve Detection of Rotor Angular Position", Industry Application Conference, vol. 1, Oct. 12, 1998, pp. 359-363.

Jingbo Liu et al., "An On-line Position Error Compensation Method for Sensories IPM Motor Drives Using High Frequency Injection", Energy Conversion Congress and Exposition, Sep. 20, 2009, pp. 1946-1953.

European Search Report mailed Feb. 4, 2011 for EP 09 15 0321 filed Jan. 9, 2009 (in English).

Japanese Office Action with English translation mailed Aug. 14, 2012, in Japanese Patent Application No. 2008-323833, filed Dec. 19, 2008.

* cited by examiner

ROTATIONAL ANGLE DETECTION DEVICE AND METHOD FOR PERMANENT MAGNET DYNAMO-ELECTRIC MACHINE AND ELECTRIC POWER STEERING DEVICE

BACKGROUND OF THE INVENTION

1. Field of the Invention

The present invention relates to a permanent magnet dynamo-electric machine, for example, a permanent magnet dynamo-electric machine such as a servo motor applied to an electric power steering device for a vehicle.

2. Description of the Related Art

A permanent magnet dynamo-electric machine has recently been employed for various purposes, and low cogging torque is required for its performance. Cogging torque causes vibrations. For example, in a motor used in an electric power steering device, cogging torque has to be greatly reduced to improve steering feelings.

To meet demands for miniaturization and low costs of a motor, a so-called "position sensorless driving" technique has been developed, which detects a rotational angle to drive the motor even without including any rotational angle detector such as an encoder or a resolver. For example, for this position sensorless driving, there is a technology where a nonmagnetic layer is disposed on an outer surface of a rotor in a section of electrical angles of 80 to 100° in forward and backward rotational directions of the rotor around a polar boundary separating N and S poles from each other (e.g., refer to Japanese Patent Application Laid-open H09-294391).

There is another technology which externally fits and fixes a cylindrical member (e.g., refer to Japanese Patent Application Laid-open No. 2006-109663).

However, the conventional art has the following problems.

In the above-mentioned a permanent magnet dynamo-electric machines, around the polar boundary separating the N and S poles from each other, in the section of the electrical angles of 80 to 100° in the forward and backward rotational directions of the rotor, the nonmagnetic layer is disposed on the outer surface of the rotor, or the cylindrical member is externally fitted and fixed. Thus, there is a problem of a small change in inductance made by the rotational angle.

In the case of the example of the conventionally known permanent magnet synchronous motor of the self-starting type, no change in inductance is made by the rotational angle because of improper disposition of the conductor, causing a problem of unsuitability for rotational angle detection.

SUMMARY OF THE INVENTION

The present invention has been developed to solve the aforementioned problems, and it is therefore an object of the invention to enable detection of a rotational angle by measuring an armature current.

A permanent magnet dynamo-electric machine according to the present invention includes: a stator that includes an armature winding; a rotor that includes a rotor core and a plurality of permanent magnets; and a conductive circuit that includes first conductors extending in a direction parallel to a rotational axis of the rotor and being disposed in two or more places in a circumferential direction of the rotor, and second conductors for electrically interconnecting the first conductors. In this case, the first conductors are each disposed within one of a range of an electrical angle between −45° and +45° in the circumferential direction with a magnetic pole center of each of the plurality of permanent magnets being set as a reference and a range of an electrical angle between −45° and +45° with a position apart from the magnetic pole center by an electrical angle of 90° being set as a reference, and the conductive circuit is disposed in at least one place in the circumferential direction, and allows an induced current of different magnitude depending on a rotational angle of the rotor to flow therein due to an effect of a magnetic field generated by a current flowing through the armature winding.

According to the present invention, the conductive circuit is disposed, and by using a principle that a difference is generated between d-axis impedance and q-axis impedance when a high-frequency current is supplied to the armature winding, which causes flowing of an induced current of different magnitude depending on a rotational angle of the rotor through the conductive circuit, the rotational angle can be detected by measuring an armature current.

DETAILED DESCRIPTION OF THE PREFERRED EMBODIMENTS

Figure 1:
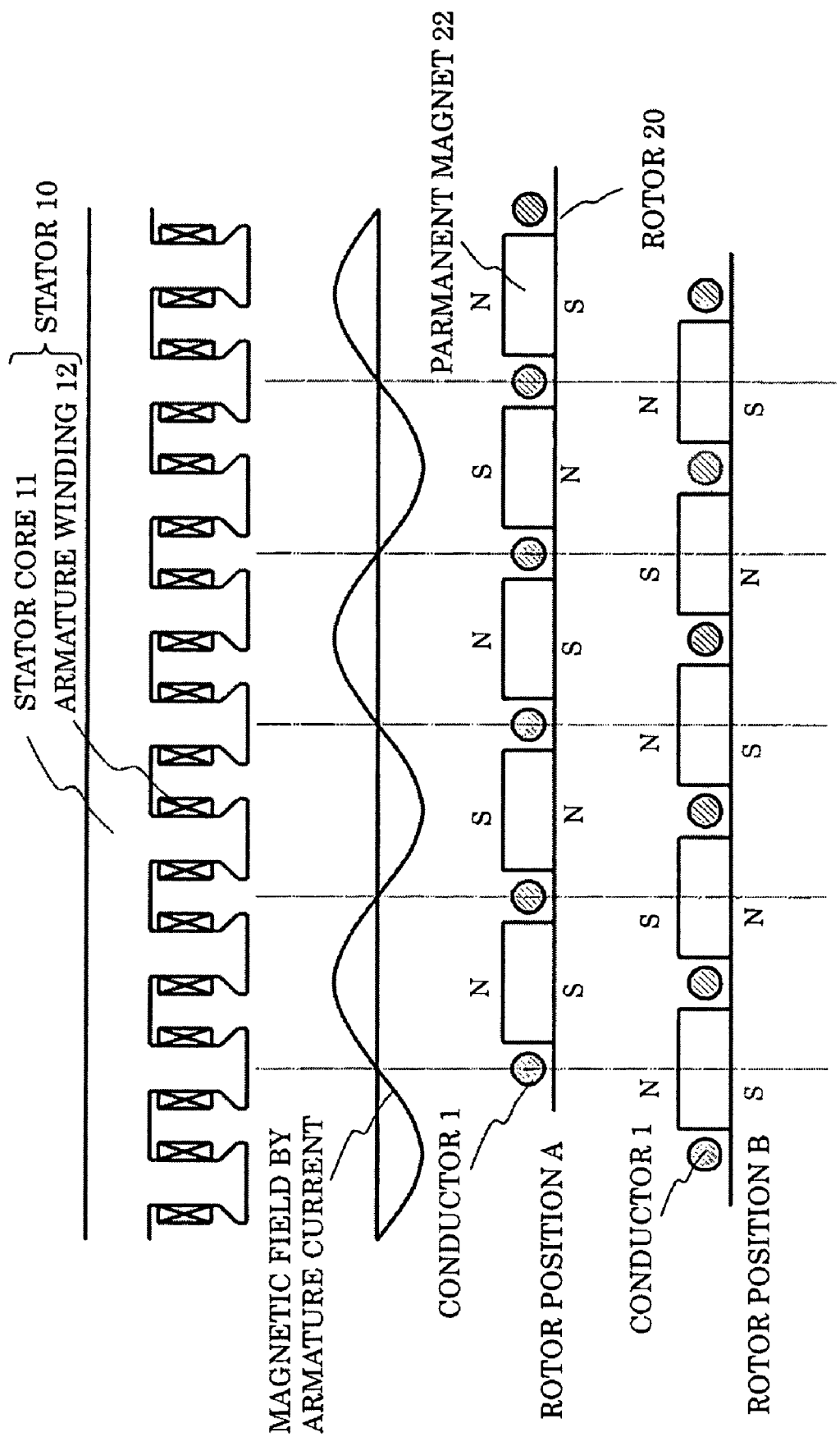
FIG. 1 is a diagram illustrating a permanent magnet dynamo-electric machine according to a first embodiment of the present invention.

Exemplary embodiments of a permanent magnet dynamo-electric machine of the present invention are described below referring to the drawings.

First Embodiment

A first embodiment is directed to a case where an induced current circuit (conductive circuit) including conductors is disposed in a rotor of a permanent magnet dynamo-electric machine, and a rotational angle of the rotor is detected.

FIG. 1 illustrates a permanent magnet dynamo-electric machine according to the first embodiment of the present invention, where conductors 1 are disposed in a rotor 20. To assist understanding, in FIG. 1, the permanent magnet dynamo-electric machine is linearly drawn, and two positional relations (rotor positions A and B) between a stator 10 and the rotor 20 are illustrated.

An upper part of FIG. 1 illustrates the stator 10 which includes a stator core 11 and armature winding 12. Below this part, a spatial distribution of magnetic fields generated by an armature current flowing through the armature winding 12 is illustrated. For brevity, only a basic wave component (component where a spatial order matches a pole logarithm) is illustrated.

A lower part of FIG. 1 illustrates two positions A and B as rotor positions with respect to the stator 10. A conductor 1 is disposed between adjacent permanent magnets 22, and N and S indicate polarities of the permanent magnet 22. In reality, the stator core 11, the armature winding 12, the conductor 1, the permanent magnet 22, and the like extend toward a rotational axis of a motor. However, FIG. 1 illustrates only a simplified cross-sectional diagram. The conductor 1 is made of a conductive member such as copper or aluminum.

In the rotor position A, a position of the conductor 1 matches a position where a magnetic field by the armature current becomes zero. In this position, the number of interlinked magnetic fluxes where magnetic fluxes generated by the magnetic field from the armature winding 12 are interlinked between the adjacent conductors 1 is largest.

In the rotor position B, a position of the conductor 1 matches a position where a magnetic field by an armature current is largest (or smallest). In this position, the number of magnetic fluxes interlinked between the adjacent conductors 1 is smallest.

When AC magnetic fluxes are interlinked in a closed circuit formed by the conductor 1, an induced current flows through the conductor 1. As the number of interlinked magnetic fluxes is larger, an induced current is larger. In other words, almost no induced current flows through the conductor 1 in the rotor position B, while an induced current is increased in the rotor position A. Flowing of the induced current causes a change in impedance of the motor. Thus, impedance varies between the rotor position A and the rotor position B. In this case, impedance is smaller in the rotor position A. If the conductor 1 is disposed between the permanent magnets 22 as illustrated in FIG. 1, the number of interlinked magnetic fluxes in the conductor 1 changes at a cycle of an electrical angle of 180°.

Figure 2:
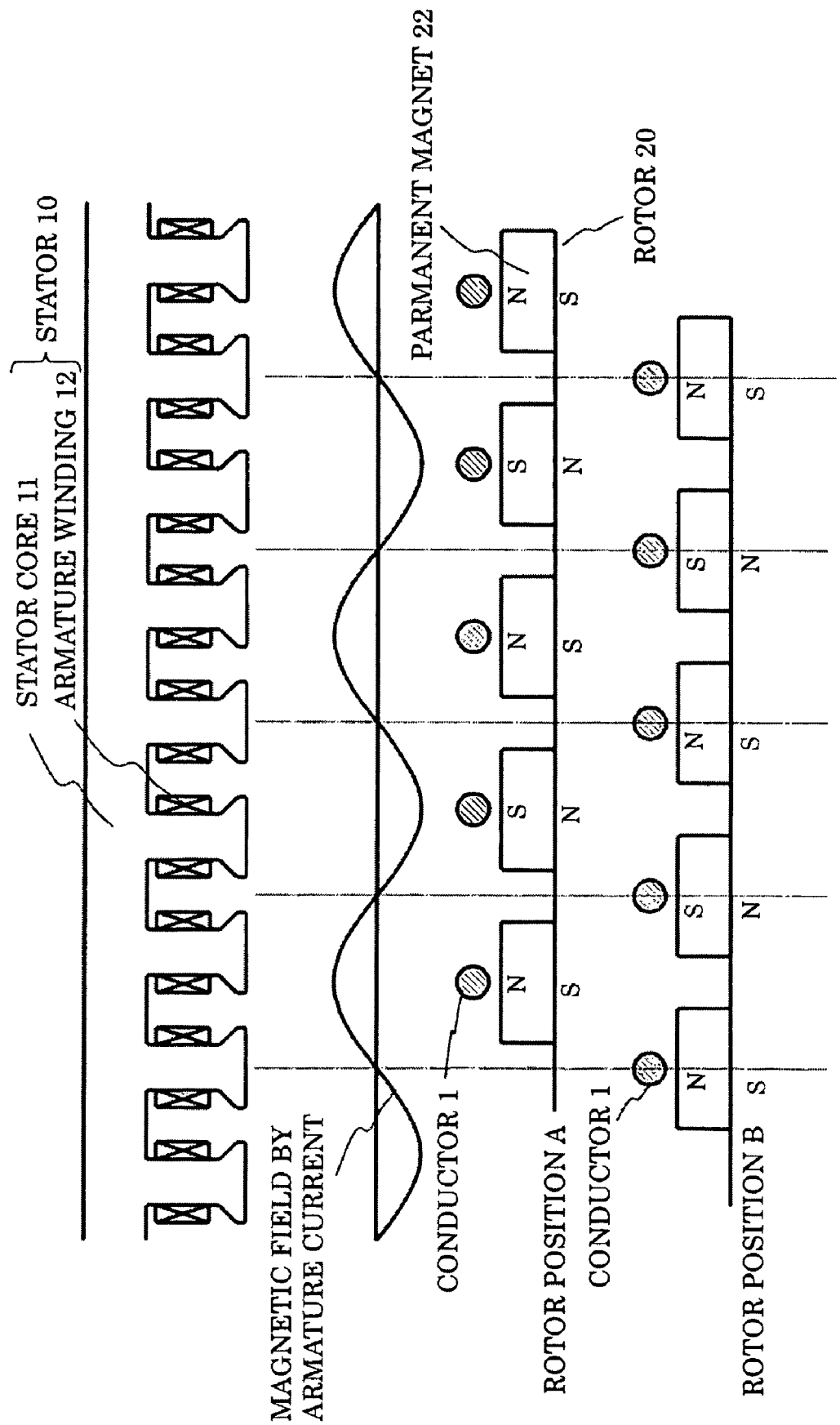
FIG. 2 is another diagram illustrating the permanent magnet dynamo-electric machine according to the first embodiment of the present invention.

FIG. 2 is another diagram illustrating the permanent magnet dynamo-electric machine according to the first embodiment of the present invention, where the conductor 1 is disposed near a magnetic pole center of the permanent magnet 22. Conversely to the case of FIG. 1, in a rotor position A of FIG. 2, a position of the conductor 1 matches a position where a magnetic field by an armature current is largest (or smallest). In a rotor position B of FIG. 2, a position of the conductor 1 matches a position where a magnetic field is zero.

The magnetic pole center indicates a center angle position of the permanent magnet constituting each magnetic pole in a circumferential direction. This angle position matches a circumferential position of a d-axis (or direct-axis) or a circumferential position apart from the d-axis by an electrical angle of 180°. For example, FIGS. 3 and 4 described below only illustrate a magnetic pole center for one magnetic pole. However, magnetic pole centers can be defined for respective magnetic poles.

In a configuration of FIG. 2, conversely to that of FIG. 1, the number of interlinked magnetic fluxes in the conductor 1 is smallest in the rotor position A, while the number of interlinked magnetic fluxes in the conductor 1 is largest in the rotor position B. As a result, almost no induced current flows through the conductor 1 in the rotor position A, while an induced current flows in the rotor position B. In other words, impedance is smaller in the rotor position B than in the rotor position A.

As in the case of FIG. 1, in the configuration of FIG. 2, the number of interlinked magnetic fluxes in the conductor 1 changes at a cycle of an electrical angle of 180°. Thus, the configurations of FIGS. 1 and 2 provide an effect of changing the impedance of the motor at the cycle of an electrical angle of 180° depending on a position of the rotor 20.

Figure 3:
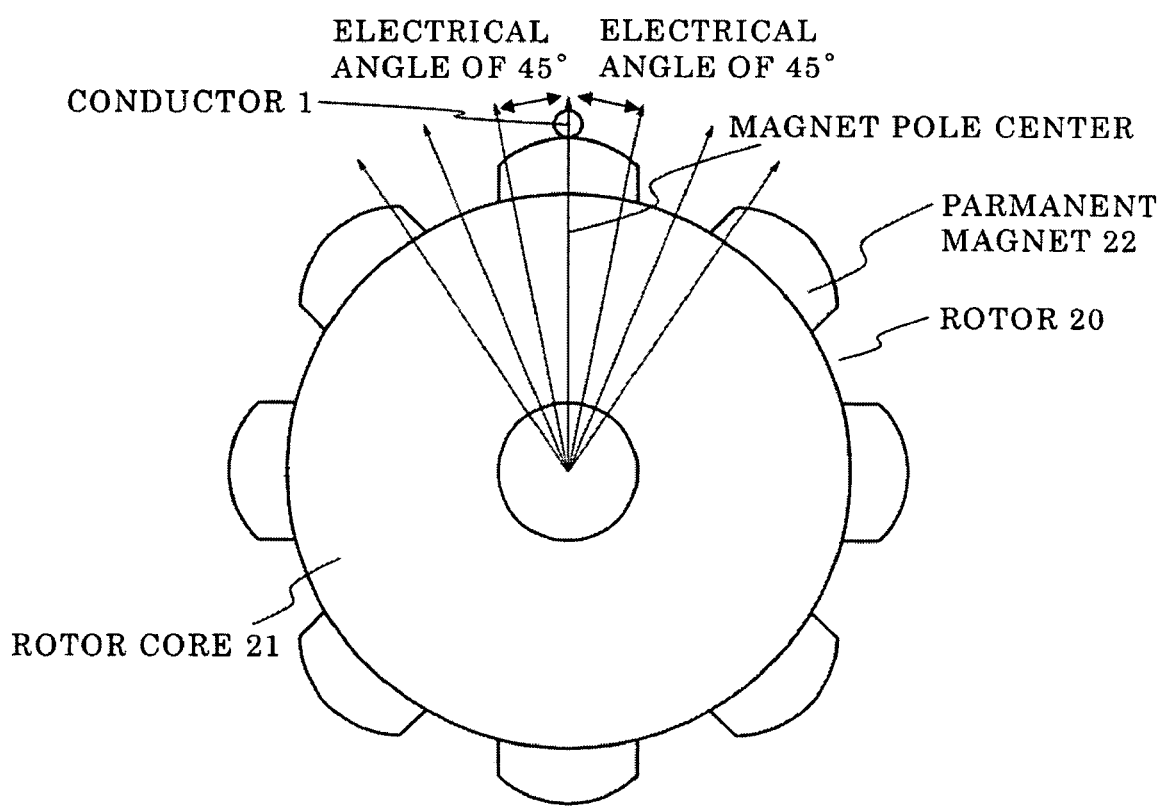
FIG. 3 is a diagram illustrating a first disposition example of a conductor according to the first embodiment of the present invention.
Figure 4:
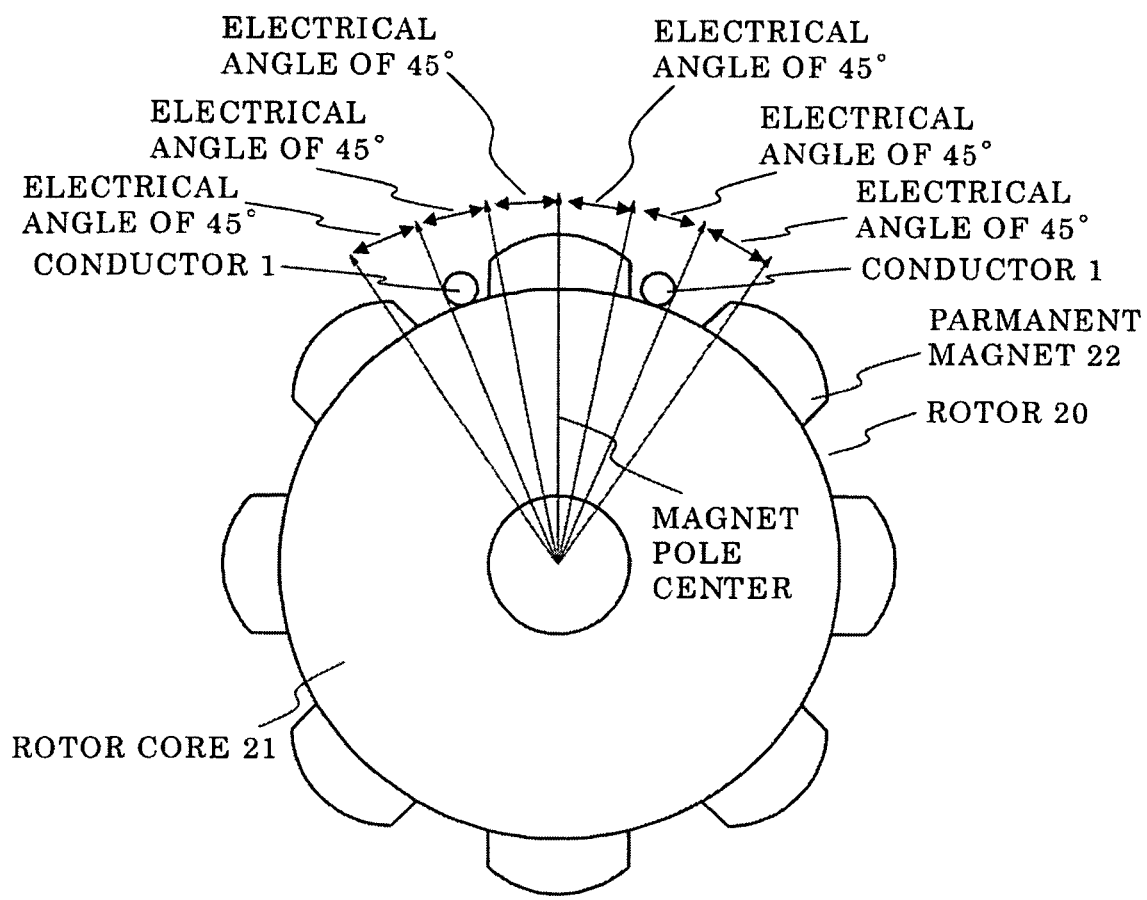
FIG. 4 is a diagram illustrating a second disposition example of the conductor according to the first embodiment of the present invention.

However, such an effect is not always obtained no matter in which position the conductor 1 is disposed. To set a changing cycle of impedance to an electrical angle of 180° depending on a position of the rotor 20, disposition of the conductor 1 has to be contrived. FIG. 3 illustrates a first disposition example of the conductor 1 according to the first embodiment of the present invention, where the conductor 1 is disposed near a magnetic pole center. FIG. 4 illustrates a second disposition example of the conductor 1 according to the first embodiment of the present invention, where the conductor 1 is disposed near a position apart from the magnetic pole center by an electrical angle of 90°. FIG. 4 illustrates only conductors 1 disposed in positions of ±90° from one magnetic pole center, omitting other conductors 1.

As illustrated in FIG. 3, when the conductors 1 are disposed within a range of electrical angles of ±45° from the magnetic pole center while no conductor 1 is disposed within a range of electrical angles of ±45° from positions apart from the magnetic pole center by an electrical angle of 90°, the number of interlinked magnetic fluxes of the conductor 1 changes at a cycle of an electrical angle of 180°.

As illustrated in FIG. 4, when the conductors 1 are disposed within a range of electrical angles of ±45° from positions apart from the magnetic pole center by an electrical angle of 90° while no conductor 1 is disposed within a range of electrical angles of ±45° from the magnetic pole center, the number of interlinked magnetic fluxes of the conductor 1 changes at a cycle of an electrical angle of 180°. Those cases provide an effect of changing impedance of the motor at a cycle of an electrical angle of 180° depending on a position of the rotor 20.

However, when the conductors 1 are present within both of the range of electrical angles of ±45° from the magnetic pole center and the range of electrical angles of ±45° from the positions apart from the magnetic pole center by an electrical angle of 90°, a changing cycle of the number of interlinked magnetic fluxes of the conductor 1 based on a rotational angle of the rotor 20 is smaller than the electrical angle of 180°, or almost no change occurs in the number of interlinked magnetic fluxes. In this case, the aforementioned effect cannot be obtained.

Next, a specific configuration of the present invention is described.

Figure 5:
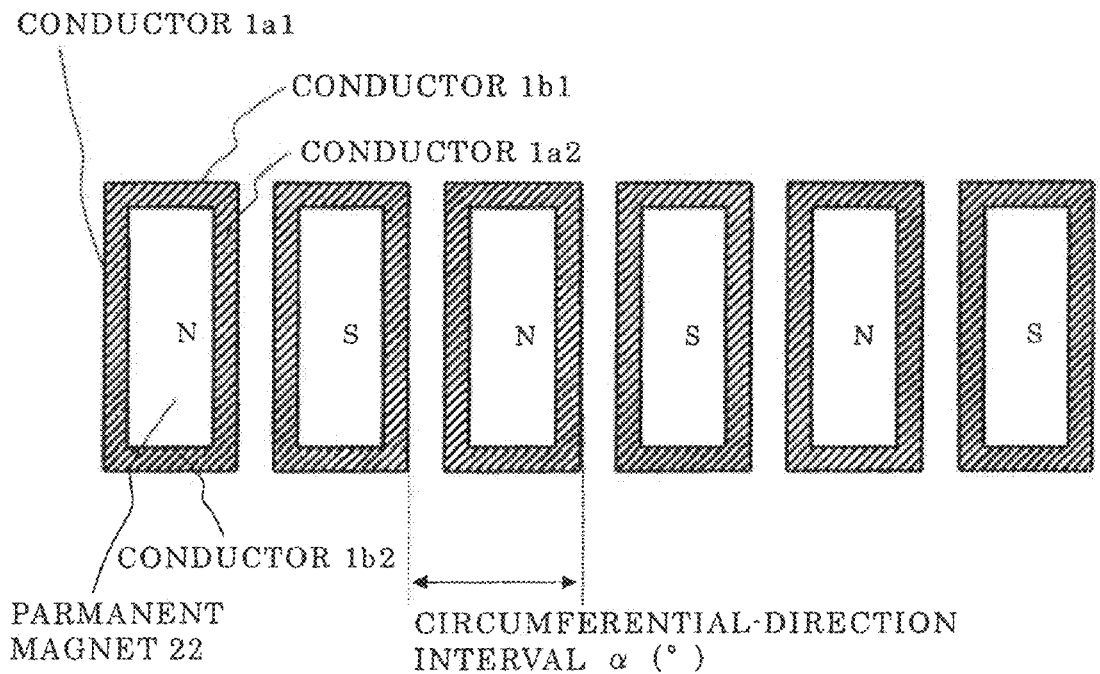
FIG. 5 is a diagram illustrating an example where the conductor is disposed on a periphery of a permanent magnet according to the first embodiment of the present invention.

FIG. 5 illustrates an example of the first embodiment of the present invention where the conductors 1 are disposed on the periphery of the permanent magnet 22. To assist understanding, FIG. 5 illustrates a state where the plurality of permanent magnets 22 disposed in a circumferential direction are arrayed in a horizontal direction, and seen from the stator 10 side. FIG. 5 illustrates six poles. However, there is no limitation on the number of motor poles.

Figure 6:
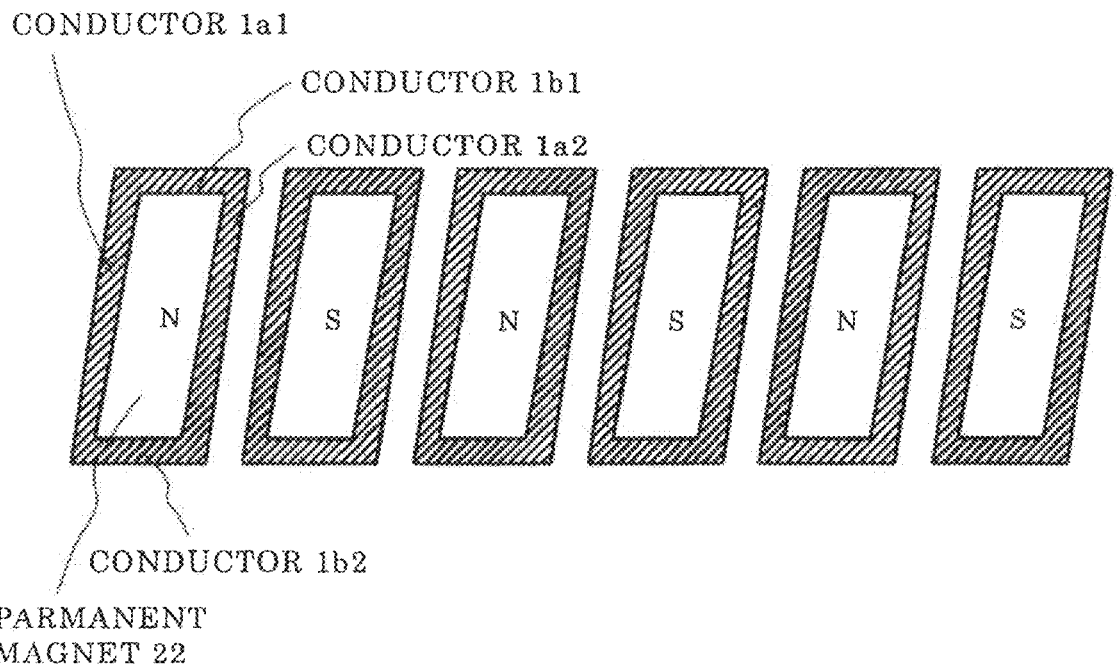
FIG. 6 is a diagram illustrating another example where the conductor is disposed on the periphery of the permanent magnet.

Referring to FIG. 5, a case where conductors $1a1$ and $1a2$ extend in a direction parallel to a rotational axis is described. However, the present invention is not limited to this case. FIG. 6 illustrates another example of the first embodiment of the present invention where the conductors 1 are disposed on the periphery of the permanent magnet 22. For example, as illustrated in FIG. 6, when the conductors $1a1$ and $1a2$ extend in an axial direction of a rotational axis in skewed states (not in parallel to the rotational axis), similar effects are obtained. The embodiment is described below based on the disposition of FIG. 5.

Adjacently to the permanent magnet 22, the conductors $1a1$ and $1a2$ are disposed to extend in a direction almost parallel or parallel to the rotational axis of the motor. Conductors $1b1$ and $1b2$ are disposed as other conductive portions for electrically interconnecting the conductors $1a1$ and $1a2$. Thus, in FIG. 5, the conductors $1a1$ and $1a2$ serving as first conductors and the conductors $1b1$ and $1b2$ serving as second conductors constitute a conductive circuit (hereinafter, referred to as electric circuit).

Electric circuits having similar configurations are disposed at circumferential-direction intervals of $\alpha°$ (electrical angle). Since the permanent magnets 22 are normally disposed at intervals of an electrical angle of 180°, $\alpha$ is preferably an electrical angle of 180°. To set an impedance change to a cycle of an electrical angle of 180°, the electric circuit is preferably disposed at intervals of an electrical angle of 180°.

However, if the conductors are disposed within one of the range of electrical angles of ±45° from the magnetic pole center and the range of electrical angles of ±45° from the positions apart from the magnetic pole center by an electrical angle of 90°, $\alpha$ may take an optional value. FIG. 5 illustrates the example where the conductors are disposed on the periphery of all the permanent magnets 22. However, the conductors may be disposed only on the periphery of a part of permanent magnets 22.

Figure 7:
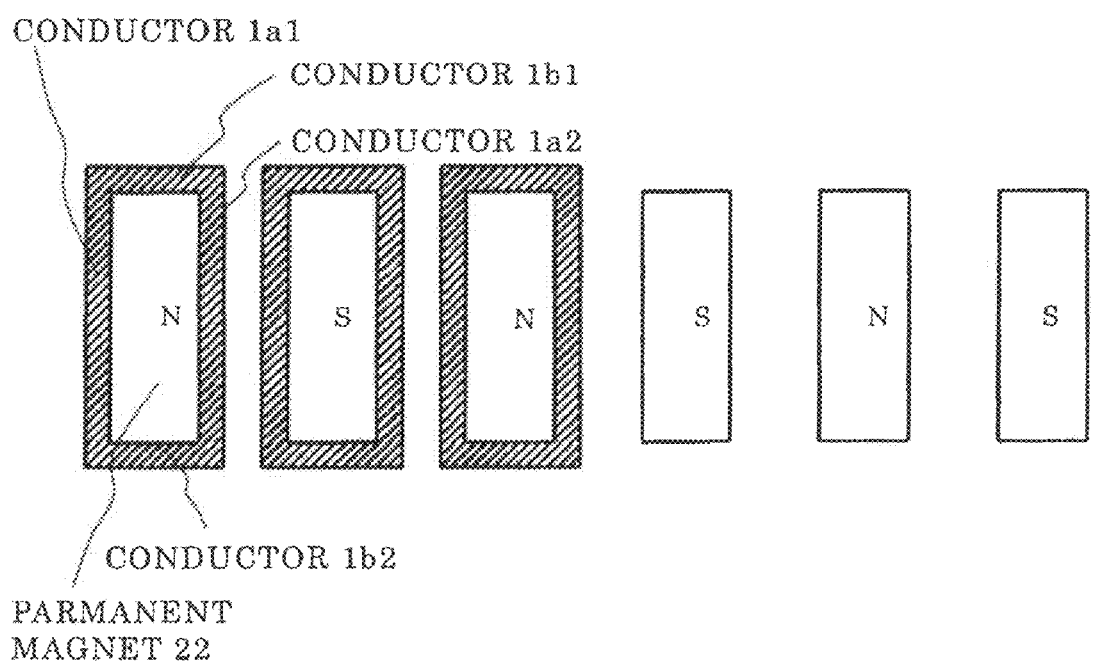
FIG. 7 is a diagram illustrating still another example where the conductor is disposed on the periphery of the permanent magnet according to the first embodiment of the present invention.

FIG. 7 illustrates another example where the conductors are disposed on the periphery of the permanent magnets 22 according to the first embodiment of the present invention. As illustrated in FIG. 7, even when the electric circuits are disposed in three of six poles, as in the case of FIG. 5, an effect of changing impedance of the motor depending on positions of the rotor 20 can be obtained.

FIG. 7 illustrates the example where the intervals of disposing the electric circuits is an electrical angle of 180°. However, if intervals are 180×n° (n is an integer of 1 or more), rotor position dependences of magnetic fluxes interlinked in the respective electric circuits are similar, and thus similar effects can be obtained.

However, not by disposing an electric circuit in a specific place but by disposing electric circuits at equal intervals over the entire periphery of the rotor 20 as in the case of the configuration of FIG. 5, rotational balance is improved. Moreover, as compared with the case of disposing the electric circuit only in a specific place, a difference between d-axis impedance and q-axis impedance when a high-frequency current is supplied to the armature winding is larger, enabling improvement of detection accuracy of a rotational angle.

Figure 8:
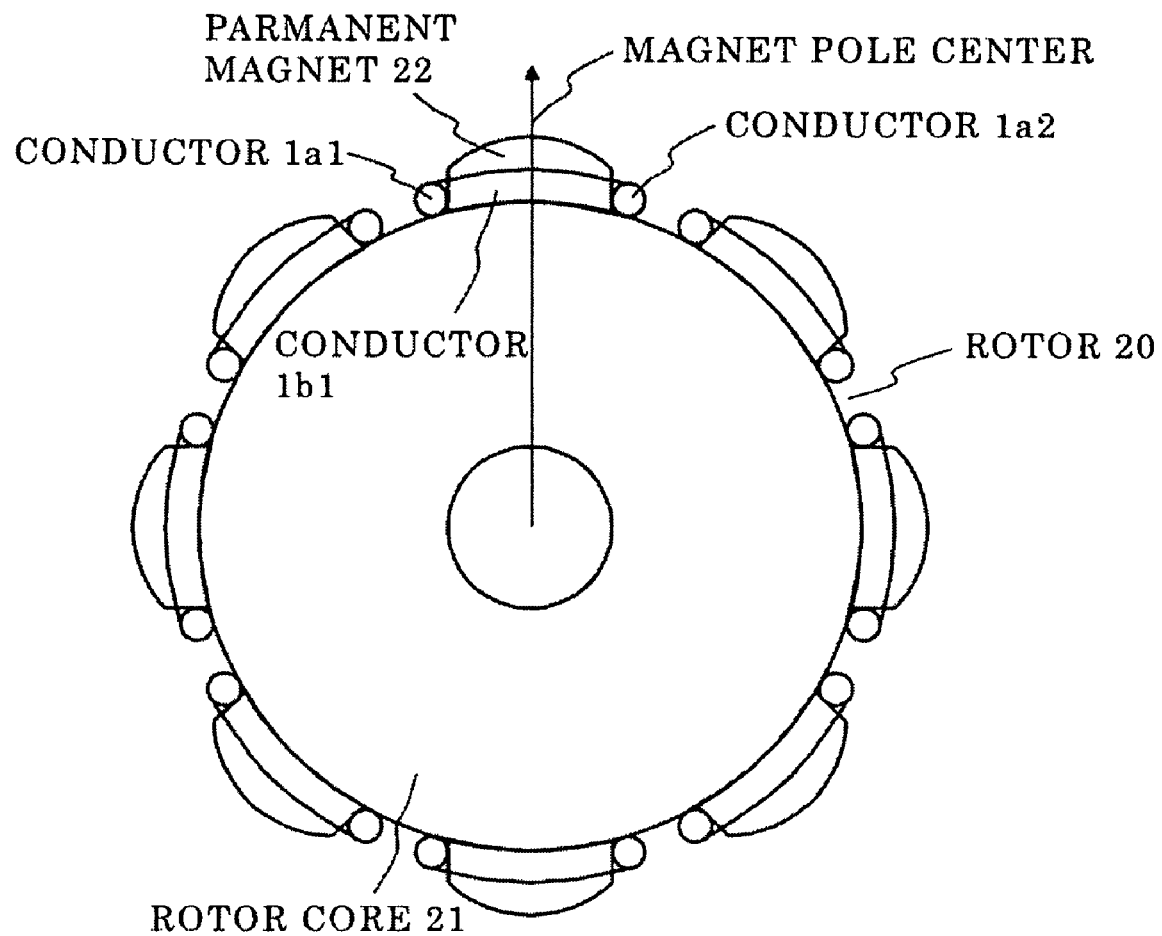
FIG. 8 is a diagram illustrating a rotor seen from a rotational axis direction when electric circuits are disposed in all magnetic poles according to the first embodiment of the present invention.
Figure 9:
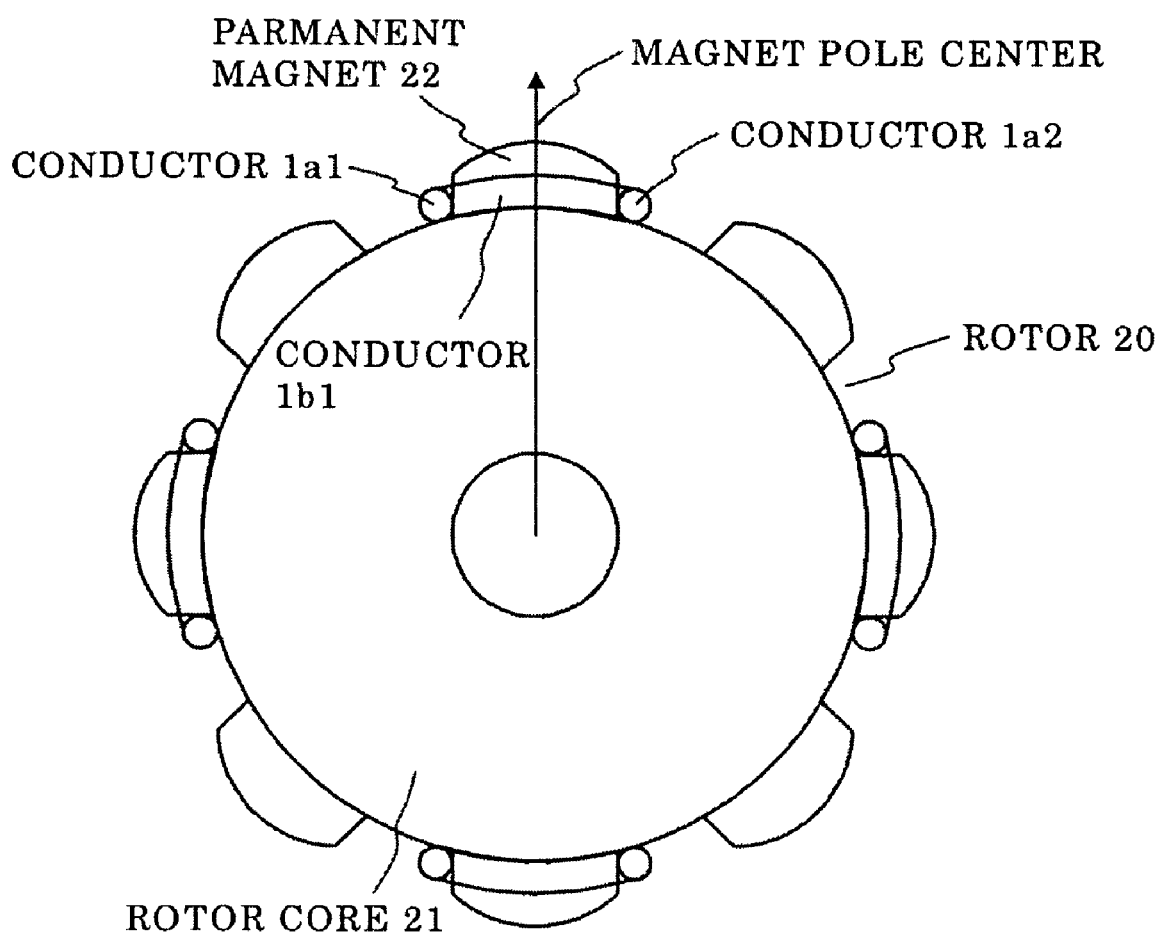
FIG. 9 is a diagram illustrating the rotor seen from the rotational axis direction when electric circuits are disposed in a part of magnetic poles according to the first embodiment of the present invention.

FIG. 8 illustrates the rotor 20 seen from a rotational axis direction thereof when electric circuits are disposed in all the magnetic poles according to the first embodiment of the present invention, i.e., electric circuits are disposed in all the eight poles. FIG. 9 illustrates the rotor 20 seen from the rotational axis direction thereof when electric circuits are disposed in some magnetic poles according to the first embodiment of the present invention, i.e., electric circuits are disposed in four of the eight magnetic poles.

FIGS. 8 and 9 illustrate the conductors $1a1$ and $1a2$ which extend in the direction almost parallel to or parallel to the rotational axis, and the conductor $1b1$ which is another conduction portion to interconnect the conductors $1a1$ and $1a2$, omitting the conductor $1b2$. In FIG. 9, a circumferential-direction disposing interval of electric circuits is an electrical angle of 360°, 360=180×2 (n=2), satisfying a condition that n is an integer of 1 or more. Since four electric circuits are disposed for every mechanical angle of 90°, needless to say, rotational balance is achieved.

Figure 10:
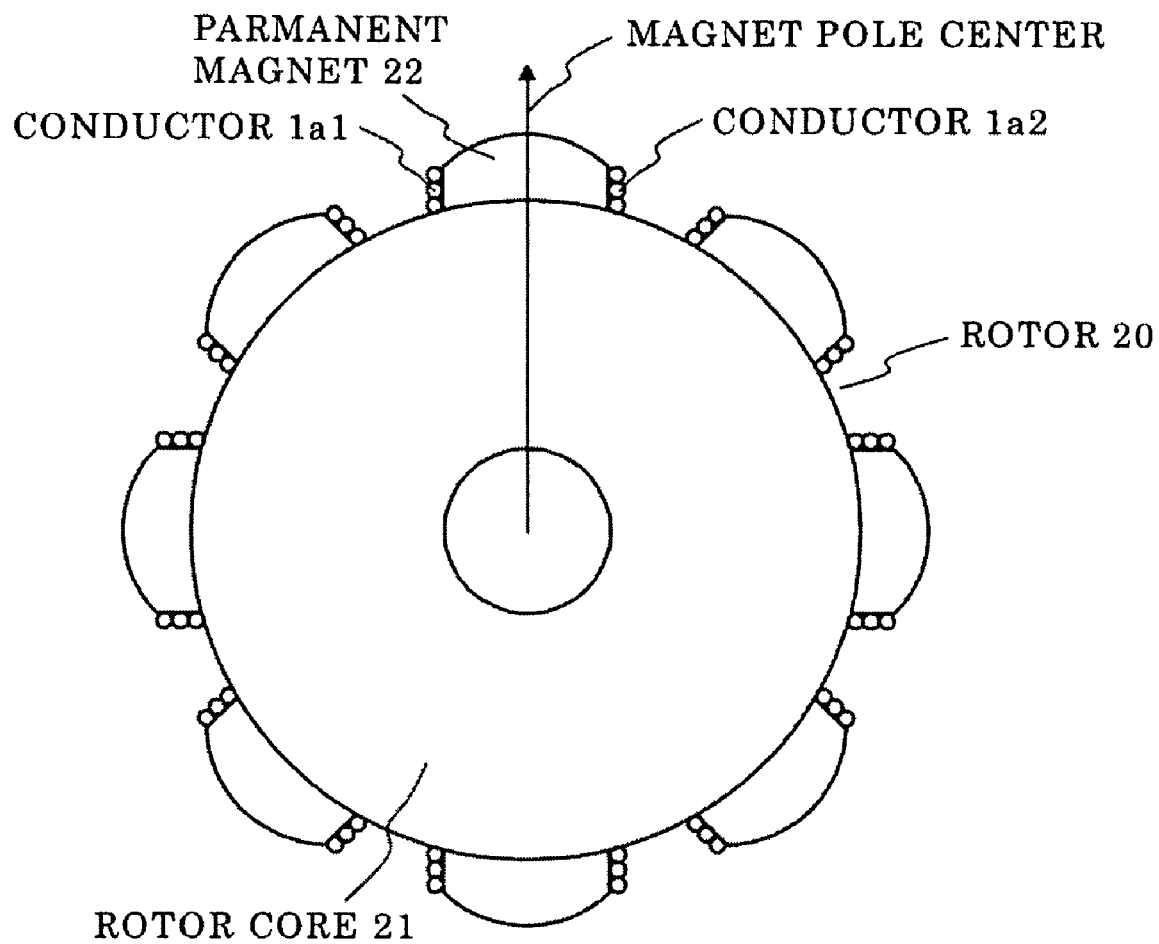
FIG. 10 is a diagram illustrating an example where an electric circuit including a conductor makes three turns according to the first embodiment of the present invention.

In the examples described above, the electric circuit which includes the first and second conductors makes one turn. However, the present invention is not limited to this case. FIG. 10 illustrates an example where the electric circuit including the first and second conductors makes three turns according to the first embodiment of the present invention. Two or more turns of the electric circuit can provide an effect of increasing the amount of magnetic fluxes interlinked in the electric circuit. Thus, more changes occur in impedance depending on positions of the rotor 20 and, by using this, detection of a rotational angle can be improved.

Figure 11:
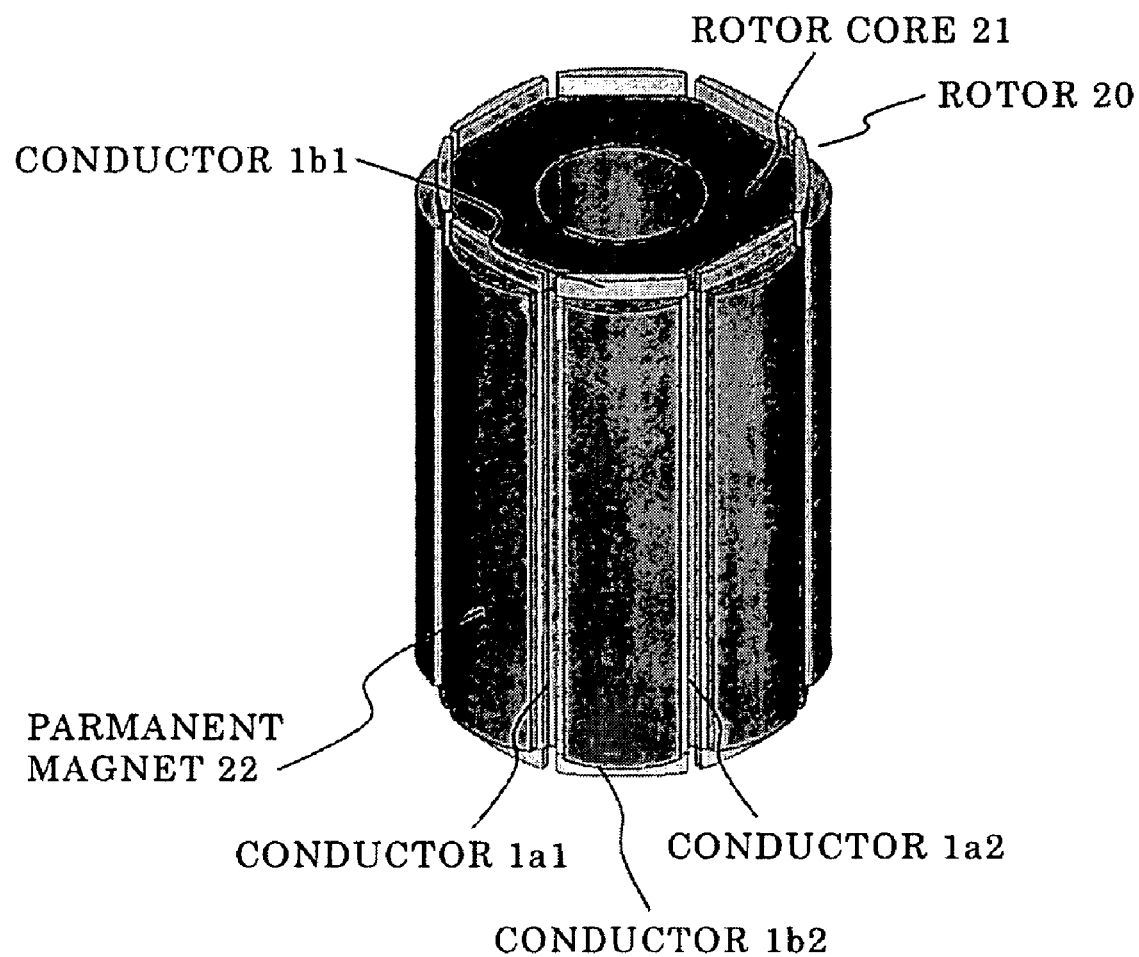
FIG. 11 is a perspective diagram illustrating a rotor of a motor according to the first embodiment of the present invention.

FIG. 11 is a perspective diagram illustrating the rotor 20 of the motor according to the first embodiment of the present invention. Permanent magnets 22 are disposed on a surface of the rotor core 21 at equal intervals in a circumferential direction. On the periphery of each permanent magnet 22, the conductors 1a1 and 1a2 (first conductors) extending in parallel to the rotational axis are present, and the conductors 1b1 and 1b2 (second conductors) are disposed as other conductors to electrically interconnect the first conductors.

The examples described above have been directed to the surface magnet type motor where the permanent magnets 22 are disposed on the surface of the rotor 20. Generally, torque pulsation such as cogging torque or torque ripple is reduced more easily in the surface magnet type motor than in a magnet-buried type motor. Thus, configuration of the present invention using the surface magnet type motor provides an effect of achieving both of "low cogging torque, low torque ripple" and "detection of a rotational angle".

"Detection of a rotational angle" using saliency of the magnet-buried type motor has conventionally been known. However, in the magnet-buried type motor, reduction of torque pulsation such as cogging torque or torque ripple is difficult. On the other hand, according to the present invention, even in the surface magnet type motor having no saliency, saliency can be generated by an induced current flowing through the conductors to perform "detection of a rotational angle", and to simultaneously achieve "low cogging torque, low torque ripple".

Figure 12:
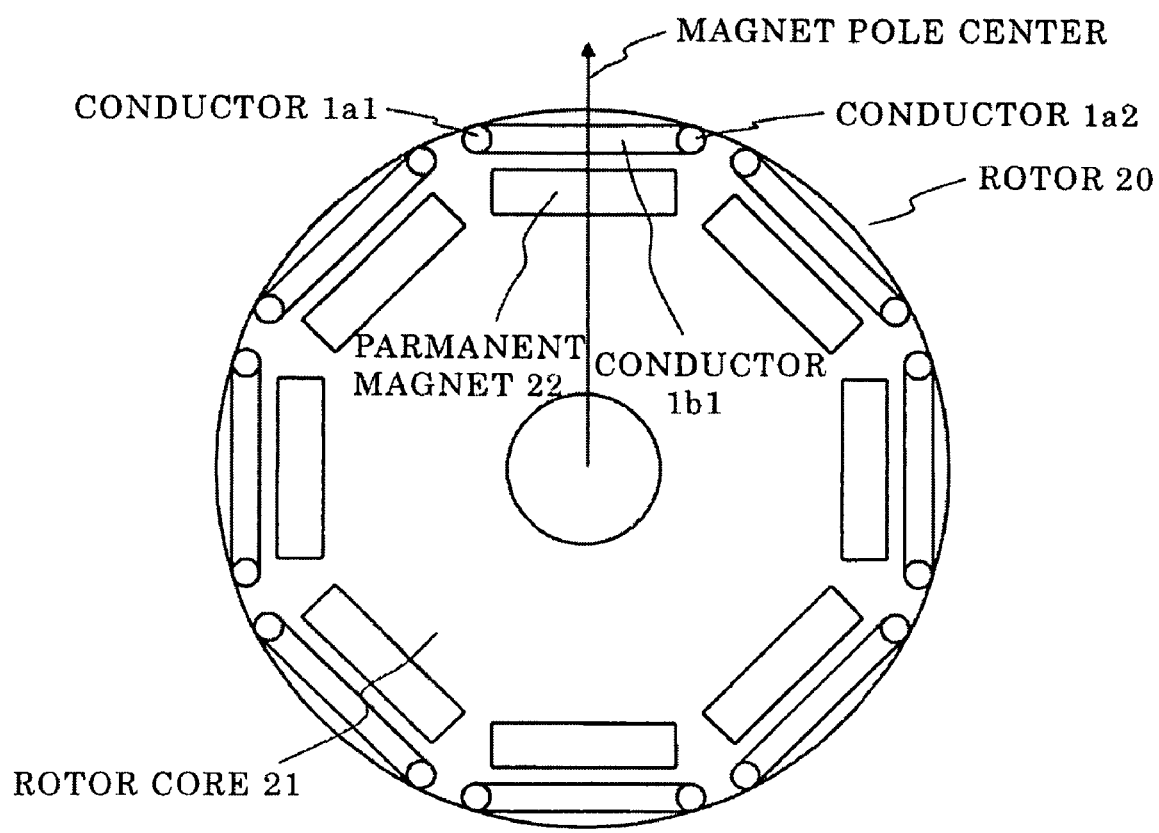
FIG. 12 is a diagram illustrating a rotor of a magnet-buried motor seen from a rotational axis direction according to the first embodiment of the present invention.

However, the present invention can be applied to the magnet-buried type motor. FIG. 12 illustrates the rotor 20 of the magnet-buried type motor seen from the rotational axis direction thereof according to the first embodiment of the present invention, where the permanent magnets 22 are buried in the rotor core 21. FIG. 12 illustrates the conductors 1a1 and 1a2 disposed on an outer diameter side of the permanent magnet 22 to extend in the direction almost parallel to or parallel to the rotational axis, and the conductor 1b1 as another conductor to electrically interconnect the conductors 1a1 and 1a2, omitting the conductor 1b2. If the electric circuit is configured this way, an induced current flowing through the conductors causes changes in impedance depending on positions of the rotor 20. By using this, a rotational angle can be detected.

Figure 13:
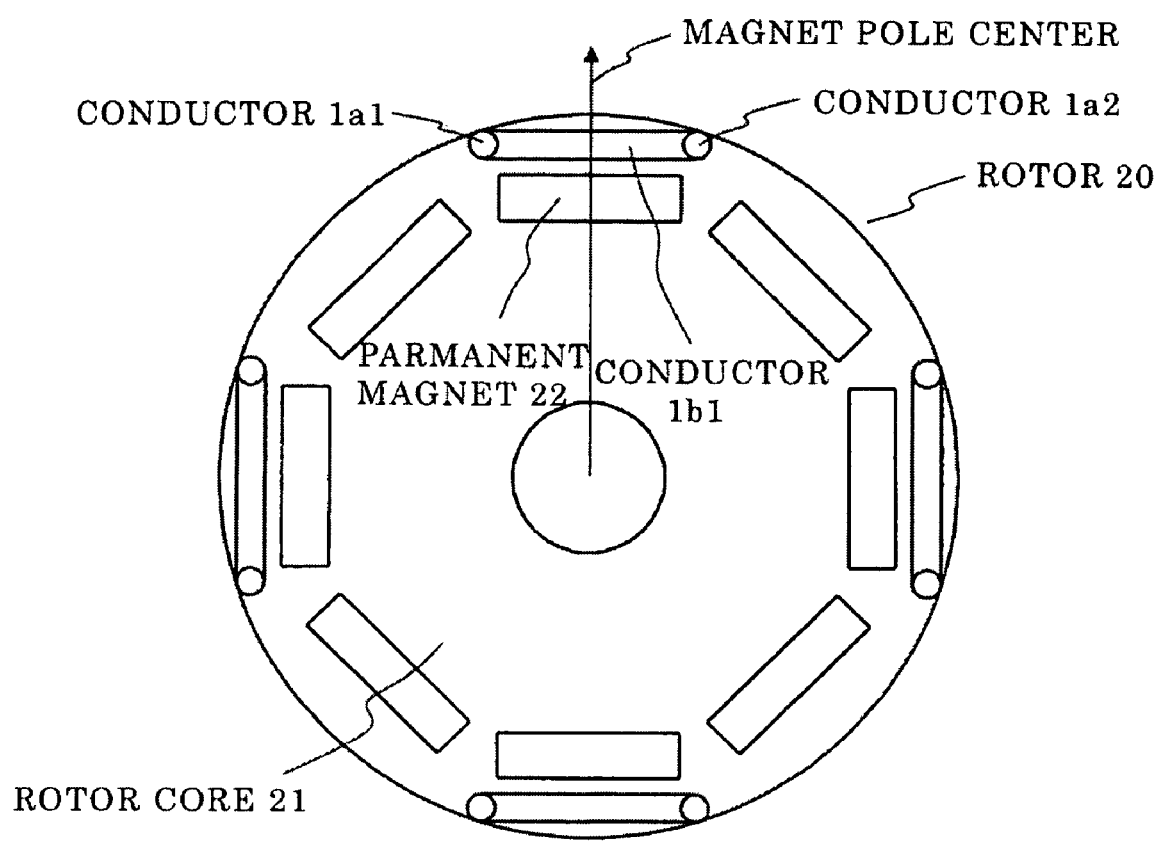
FIG. 13 is another diagram illustrating the rotor of the magnet-buried motor seen from the rotational axis direction according to the first embodiment of the present invention.

FIG. 12 illustrates a case where electric circuits are disposed in all the magnetic poles. On the other hand, FIG. 13 illustrates the rotor 20 of the magnet-buried type motor seen from the rotational axis direction thereof, where electric circuits are disposed in four of eight poles. As in the previous case, a disposing interval of electric circuits in a circumferential direction is an electrical angle of 360°, 360=180×2 (n=2), satisfying a condition that n is an integer of 1 or more. Since four electric circuits are disposed for every mechanical angle of 90°, needless to say, rotational balance is achieved.

In the examples of FIGS. 8 to 13, a middle point of circumferential positions of the conductors 1a1 and 1a2 matches a magnetic pole center. When the middle point of the circumferential positions of the conductors 1a1 and 1a2 matches the vicinity of the magnetic pole center, or the magnetic pole center, an effect is obtained in which changes in impedance depending on positions of the rotor 20 are increased, and accordingly a difference between d-axis impedance and q-axis impedance is increased. As a result, detection accuracy of a rotational angle can be improved.

In this case, d-axis impedance Zd and q-axis impedance Zq can be defined by the following equations (1) and (2):

$$Zd = Ra + j\omega Ld \quad (1)$$

$$Zq = Ra + j\omega Lq \quad (2)$$

In the equations (1) and (2), Ra is armature winding resistance, Ld and Lq are respectively d-axis inductance and q-axis inductance, and ω is an angular frequency of a high-frequency current supplied to the armature. Since the frequency of the supplied high-frequency current is, for example, several hundreds of Hz to several tens of kHz, Ra is sufficiently smaller than ωLd and ωLq. The induced current flowing through the conductors generates a difference between Ld and Lq. Thus, a difference is generated between d-axis impedance and q-axis impedance.

Figure 14:
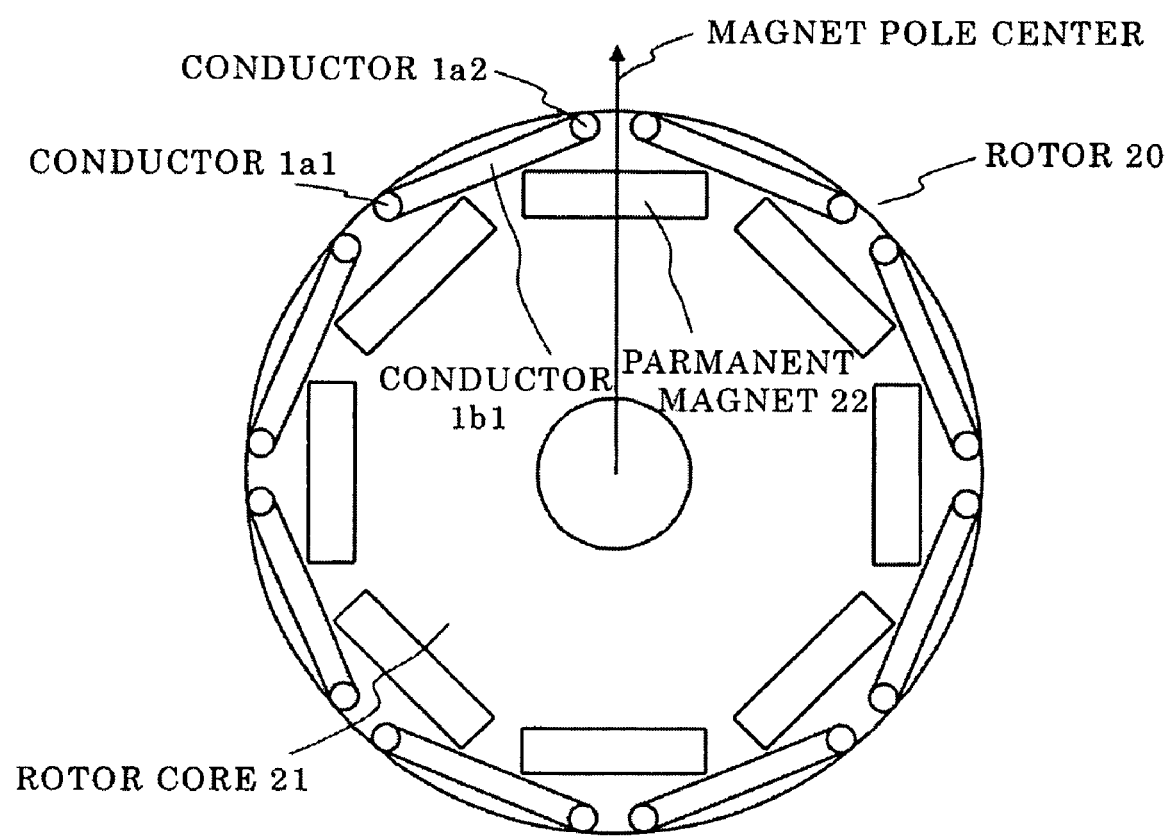
FIG. 14 is a diagram illustrating an example where a middle point of a circumferential position of a first conductor of the magnet-buried motor is in a position apart from a magnetic pole center by an electrical angle of 90° according to the first embodiment of the present invention.

FIG. 14 illustrates an example where the middle point of the circumferential positions of the conductors 1a1 and 1a2 of the magnet-buried type motor is in a position apart from the magnetic pole center by an electrical angle of 90° according to the first embodiment of the present invention. As in the previous case, an effect is obtained in which increased changes in impedance depending on positions of the rotor 20 are increased, and accordingly a difference between d-axis impedance and q-axis impedance is increased. Thus, detection accuracy of a rotational angle can be improved.

Figure 15:
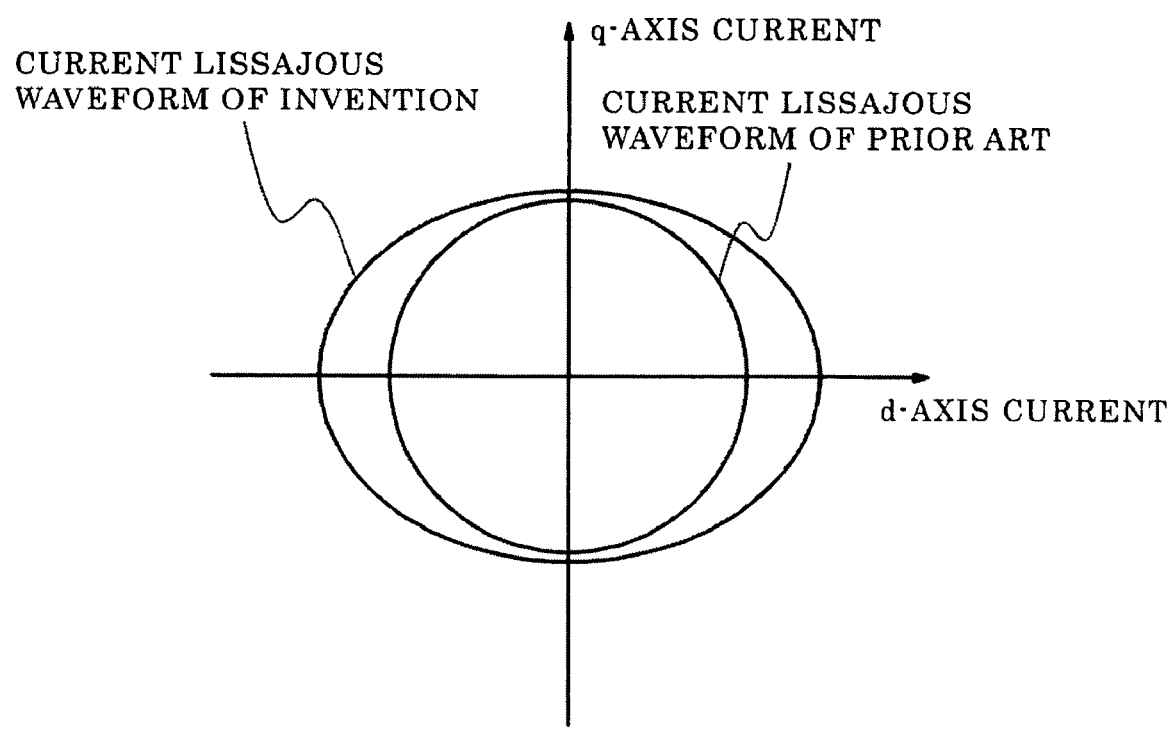
FIG. 15 is a graph showing a Lissajous waveform when a high-frequency current is supplied at no load according to the first embodiment of the present invention.

When a high-frequency current is supplied to the motor having the configuration of the first embodiment, a current flowing through the armature winding 12 is subjected to dq conversion, a d-axis current being indicated by an abscissa and a q-axis current being indicated by an ordinate, a Lissajous waveform can be obtained. FIG. 15 shows a Lissajous waveform when a high-frequency current is supplied at no load according to the first embodiment of the present invention.

In the conventional surface magnet type motor which includes no conductors according to the first embodiment, there are almost no saliency, nor almost no changes in impedance depending on positions of the rotor 20. Thus, a circular Lissajous waveform is formed. However, in the case of the motor of the first embodiment, impedance is changed depending on position of the rotor 20 by using flowing of the induced current through the conductors. Thus, an elliptic Lissajous waveform is formed.

In the example of FIG. 15, a d-axis current is large, in other words, d-axis impedance is small. However, conversely, a configuration where q-axis impedance is small can be employed. This configuration can be realized by disposing the conductors 1a1 and 1a2 near the magnetic pole center. In this case, an elliptic Lissajous waveform of a large q-axis current is formed.

Figure 16:
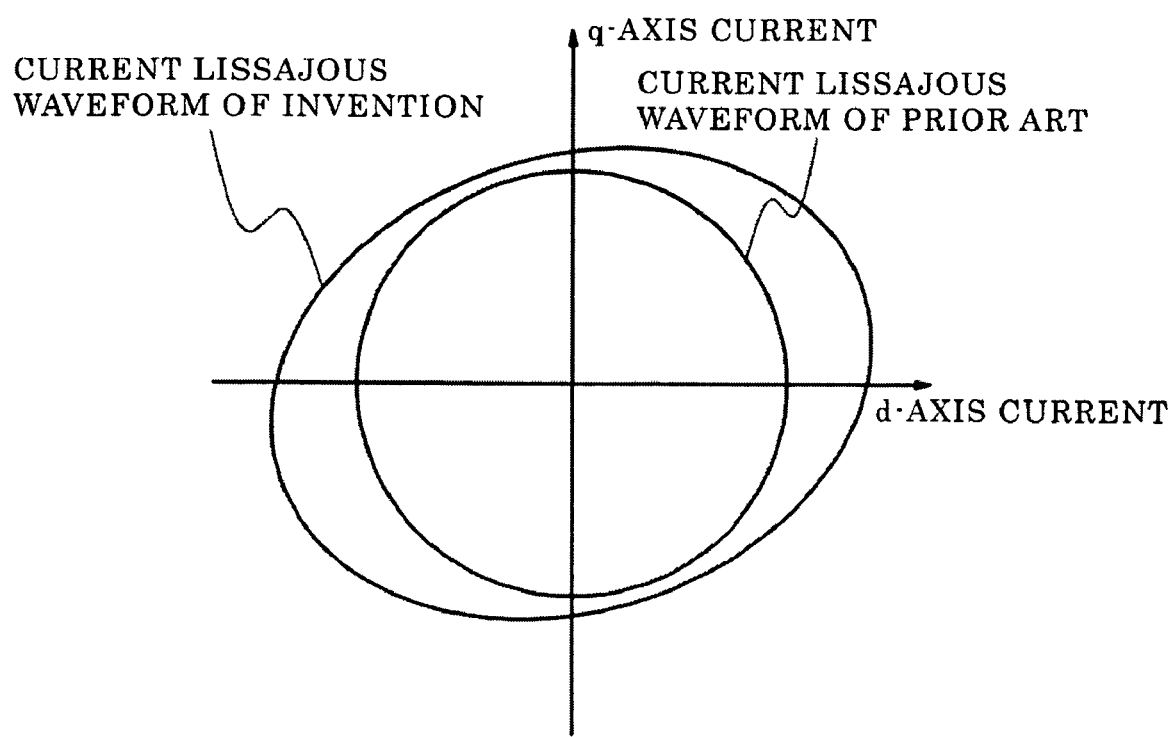
FIG. 16 is a graph showing a Lissajous waveform when a load current flows according to the first embodiment of the present invention.

FIG. 16 shows a Lissajous waveform when a load current flows according to the first embodiment of the present invention. When a load current flows, magnetic saturation of the core may cause inclination of a Lissajous waveform. Even in such a case, a rotor position can be estimated based on the load current and long-axis inclination of an ellipse. Thus, a rotational angle can be detected by measuring an armature current.

Thus, according to the first embodiment, by disposing conductors (conductive circuits) having the aforementioned configuration in the rotor, a difference is generated between d-axis impedance and q-axis impedance when a high-frequency current is supplied to the armature winding. Thus, by using such a phenomenon, even without disposing any rotational angle detector such as an encoder or a resolver, a rotational angle can be detected by measuring an armature current. As a result, a structure of the permanent magnet dynamo-electric machine can be simplified, and miniaturization and low costs thereof can be realized.

The drawings of the first embodiment omit holding of the permanent magnets 22. However, even when there are members to hold the permanent magnets 22, similar effects can be obtained. For example, a stainless-steel tubular holding member may be disposed in an outer peripheral part of the permanent magnet 22. Moreover, irrespective of materials of the permanent magnets 22, similar effects can be obtained. For example, a ferrite magnet or a rare-earth permanent magnet such as a neodymium sintered magnet may be used.

Second Embodiment

The first embodiment has been described by way of case where the individual electric circuits are disposed on the periphery of the permanent magnets 22, for example, as illustrated in FIGS. 5 and 7. However, a second embodiment is described by way of case where all conductors disposed on the periphery of permanent magnets 22 are electrically interconnected.

Figure 17:
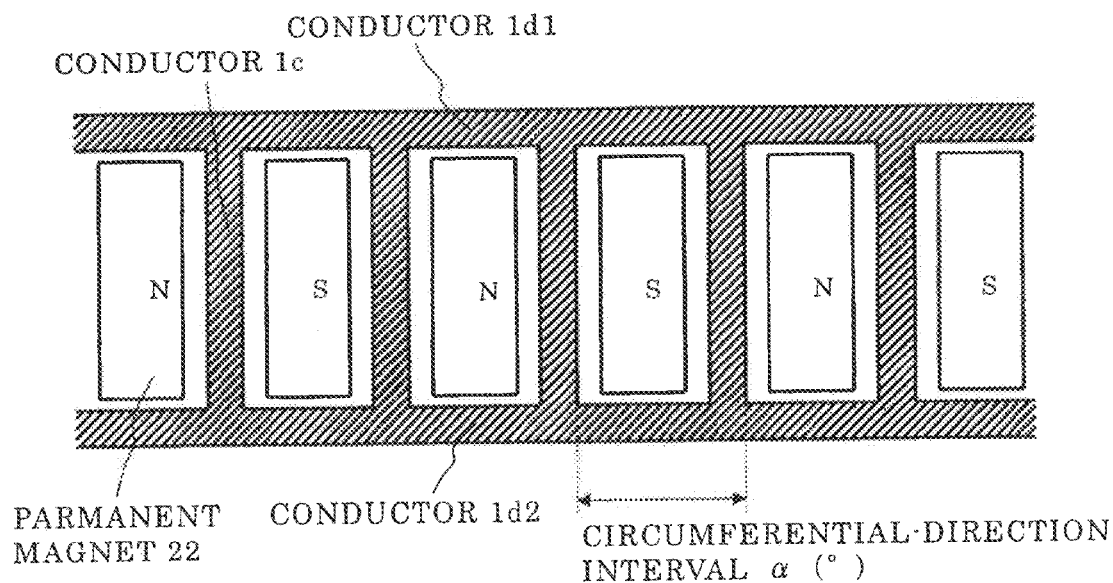
FIG. 17 is a diagram illustrating an example where a conductor is disposed on a periphery of a permanent magnet according to a second embodiment of the present invention.

FIG. 17 illustrates an example where conductors are disposed on the periphery of permanent magnets 22 according to the second embodiment of the present invention, where all the conductors are electrically interconnected. To assist understanding, FIG. 17 illustrates a state where a plurality of permanent magnets 22 disposed in a circumferential direction are arrayed in a horizontal direction and seen from a stator 10. FIG. 17 illustrates six poles. However, the number of poles of a motor is not limited to this.

Figure 18:
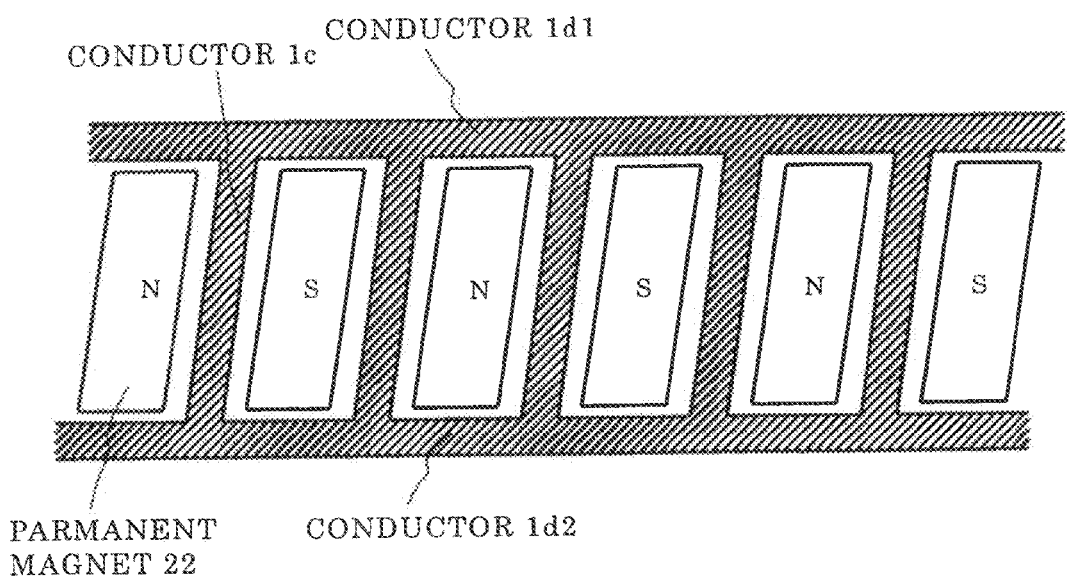
FIG. 18 is a diagram illustrating another example where the conductor is disposed on the periphery of the permanent magnet according to the second embodiment of the present invention.

Referring to FIG. 17, the case where a conductor 1c extends in a direction parallel to a rotational axis has been described. However, the present invention is not limited to this case. FIG. 18 illustrates another example where conductors are disposed on the periphery of permanent magnets according to the second embodiment of the present invention. As illustrated in FIG. 18, even when a conductor 1c extends in an axial direction of a rotational axis in a skewed state (not parallel to the rotational axis), similar effects can be obtained. The disposition illustrated in FIG. 17 is described below.

Between adjacent permanent magnets 22, the conductor 1c is disposed to extend in a direction almost parallel to or parallel to the rotational axis of the motor. As another conductor portion to electrically interconnect the conductors 1c, conductors 1d1 and 1d2 are disposed so that all the conductors 1c can be electrically interconnected. Thus, in FIG. 17, the conductor 1c as a first conductor and the conductors 1d1 and 1d2 as second conductors constitute a conductive circuit (electric circuit hereinafter).

The conductors 1c are disposed at circumferential-direction intervals of α° (electrical angle). Since the permanent magnets 22 are normally disposed at intervals of circumferential-direction intervals of an electrical angle of 180, α is preferably an electrical angle of 180°. To set an impedance change to a cycle of an electrical angle of 180°, the conductors 1c are preferably disposed also at circumferential-direction intervals of an electrical angle of 180°.

However, if the conductors are disposed within one of the range of electrical angles of ±45° from the magnetic pole center and the range of electrical angles of ±45° from the positions apart from the magnetic pole center by an electrical angle of 90°, α may take an optional value. FIG. 17 illustrates the example where the conductors are disposed on the periphery of all the permanent magnets 22. However, the conductors may be disposed only on the periphery of a part of permanent magnets 22.

Figure 19:
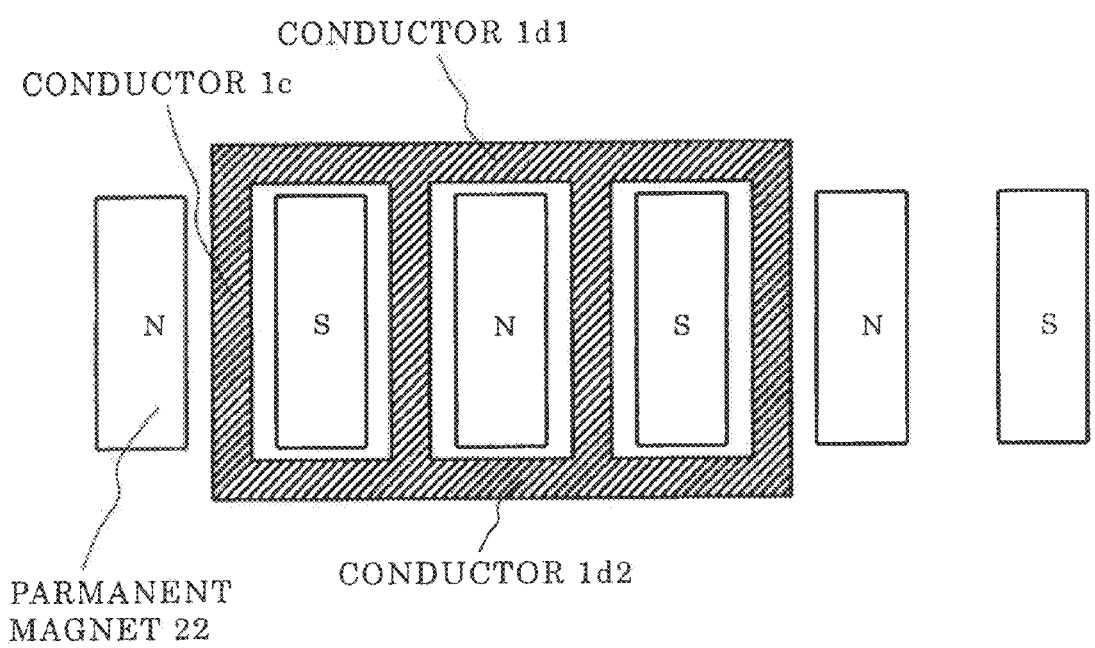
FIG. 19 is a diagram illustrating still another example where the conductor is disposed on the periphery of the permanent magnet according to the second embodiment of the present invention.

FIG. 19 illustrates another example where conductors are disposed on the periphery of permanent magnets 22 according to the second embodiment of the present invention. As illustrated in FIG. 19, even when totally four conductors 1c are disposed in three of six poles, as in the case of FIG. 17, an effect of changing impedance of the motor depending on positions of the rotor 20 can be obtained. FIG. 19 illustrates the example where the four conductors 1c are all interconnected electrically by the conductors 1d1 and 1d2, and the conductors are disposed in the three adjacent poles. However, conductors may not be always disposed in adjacent poles.

Figure 20:
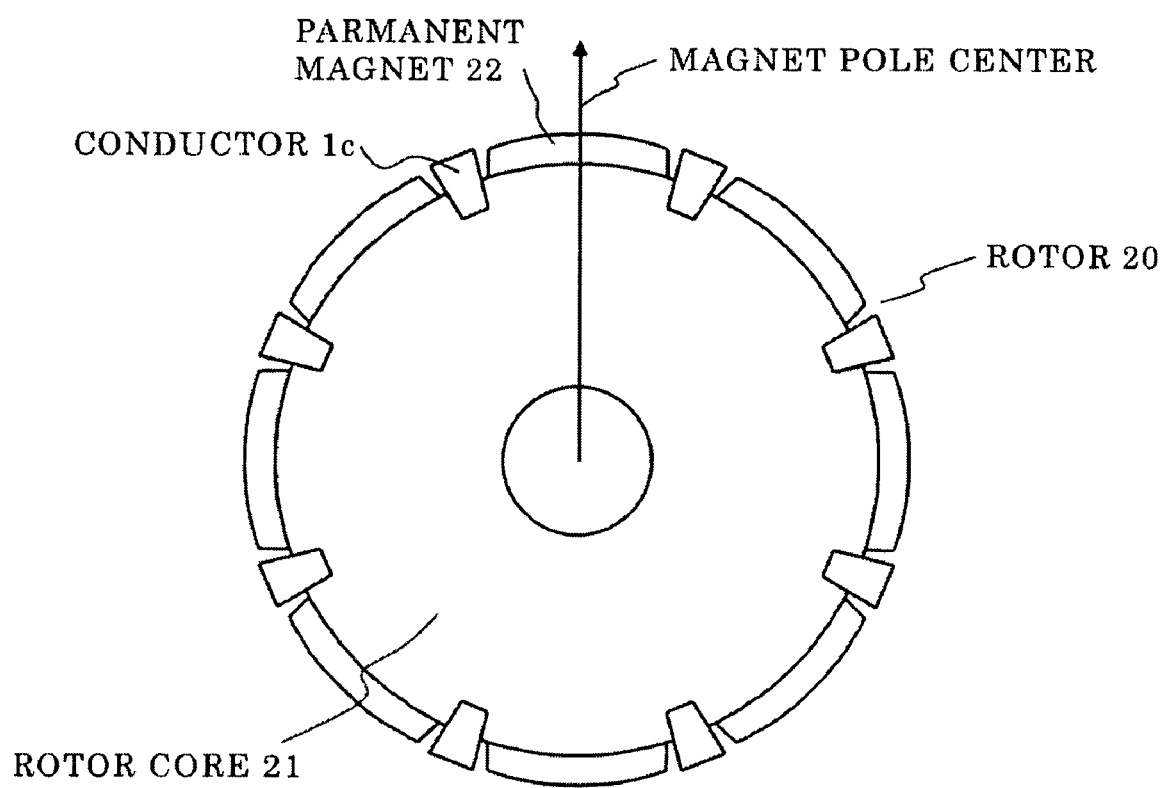
FIG. 20 is a diagram illustrating a rotor seen from a rotational axis direction when all conductors are electrically connected according to the second embodiment of the present invention.

FIG. 20 illustrates the rotor 20 seen from a rotational axis direction when all the conductors are electrically interconnected according to the second embodiment of the present invention. FIG. 20 is a cross-sectional diagram vertically cut along the rotational axis, illustrating the rotor 20 of a surface magnet type where permanent magnets 22 of eight poles are disposed in a circumferential direction. Totally eight conductors 1c are disposed among the permanent magnets 22 of all the eight poles. Though not shown in FIG. 20, as in the case of FIG. 17, the eight conductors 1c are all interconnected electrically by other conductive portions (second conductors).

Figure 21:
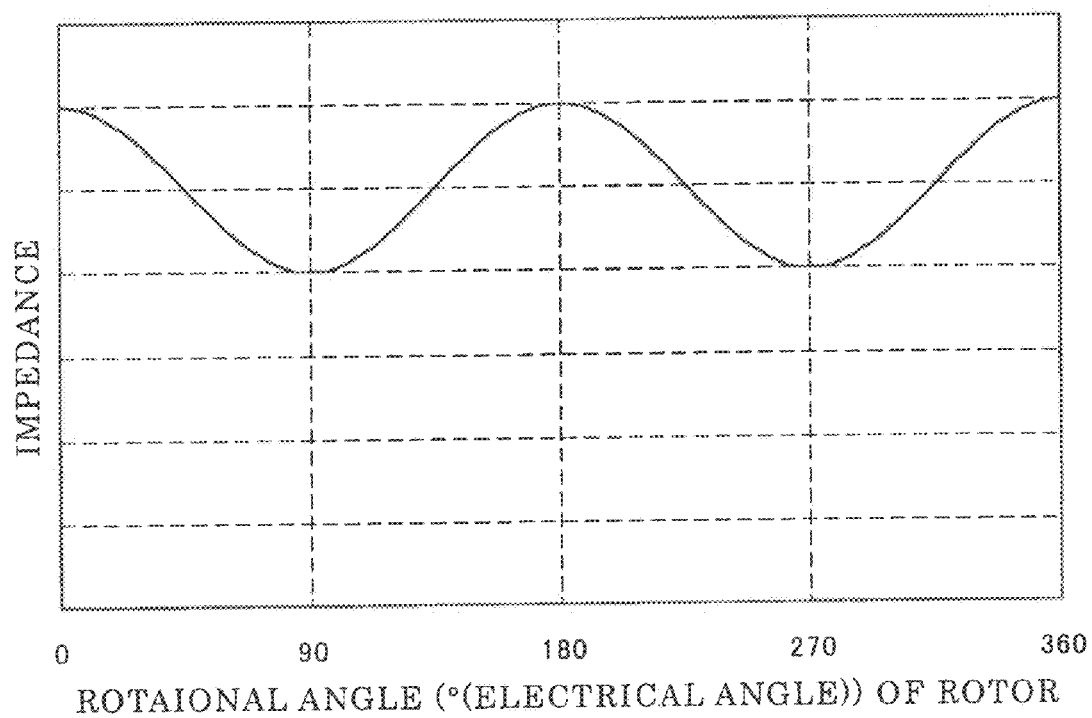
FIG. 21 is a graph showing a relation between a rotational angle of the rotor and impedance according to the second embodiment of the present invention.

This configuration provides an effect of changing impedance depending on positions of the rotor 20 when a high-frequency current is supplied to armature winding 12. By using this phenomenon, a position of the rotor 20 can be detected. FIG. 21 shows a relation between a rotational angle of the rotor 20 and impedance according to the second embodiment. As shown in FIG. 21 where an abscissa indicates a rotational angle of the rotor 20 and an ordinate indicates impedance, impedance changes at a cycle of an electrical angle of 180°.

Figure 22:
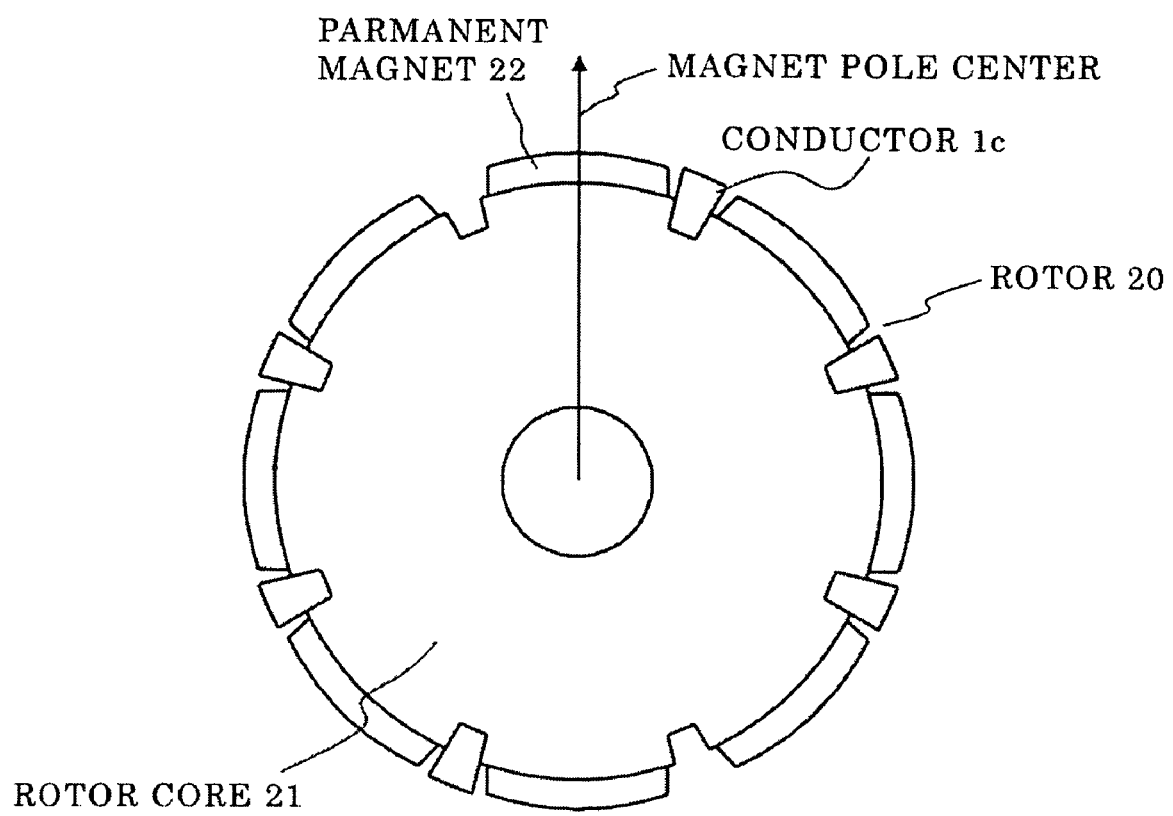
FIG. 22 is another diagram illustrating the rotor seen from the rotational axis direction when all the conductors are electrically connected according to the second embodiment of the present invention.

FIG. 22 is another diagram illustrating the rotor 20 seen from the rotational axis direction when all the conductors are electrically interconnected according to the second embodiment of the present invention. FIG. 20 illustrates the case where the conductors 1c are disposed among the permanent magnets of all the eight poles. However, FIG. 22 illustrates a case where conductors 1c are disposed partially (six of eight poles).

Though not illustrated in FIG. 22, as in the case of FIG. 19, the six conductors 1c are all interconnected electrically by other conductive portions (second conductors). Thus, similar effects can be obtained even without disposing conductors among all the permanent magnets 22.

By disposing electric circuits not in only specific places but over all around at equal intervals as in the case of the configurations of FIGS. 17 and 20, rotational balance is improved. Moreover, as compared with a case where an electric circuit is disposed only in a specific place, a difference is larger between d-axis impedance and q-axis impedance when a high-frequency current is supplied to the armature winding, enabling improvement of detection accuracy of a rotational angle.

In FIGS. 20 and 22, the conductor 1c has a portion protruded from the rotor core 21 outwardly in the diameter direction. This configuration provides an effect of more efficiently interlinking magnetic fluxes by a high-frequency current of the armature winding 12. In other words, rotor position dependence of impedance conspicuously appears. Even when conductors are buried in the rotor core 21, similar effects are obtained in that impedance has rotor position dependence.

Such effects are not always obtained no matter in which position the conductors 1 are disposed. To set a changing cycle of impedance depending on positions of the rotor 20 to an electrical angle of 180°, disposition of the conductors 1 has to be contrived. As in the case of the first embodiment, when the conductors 1 are disposed in the positional relations illustrated in FIGS. 3 and 4, impedance changes depending on positions of the rotor 20, and a changing cycle of impedance is set to an electrical angle of 180°.

Figure 23:
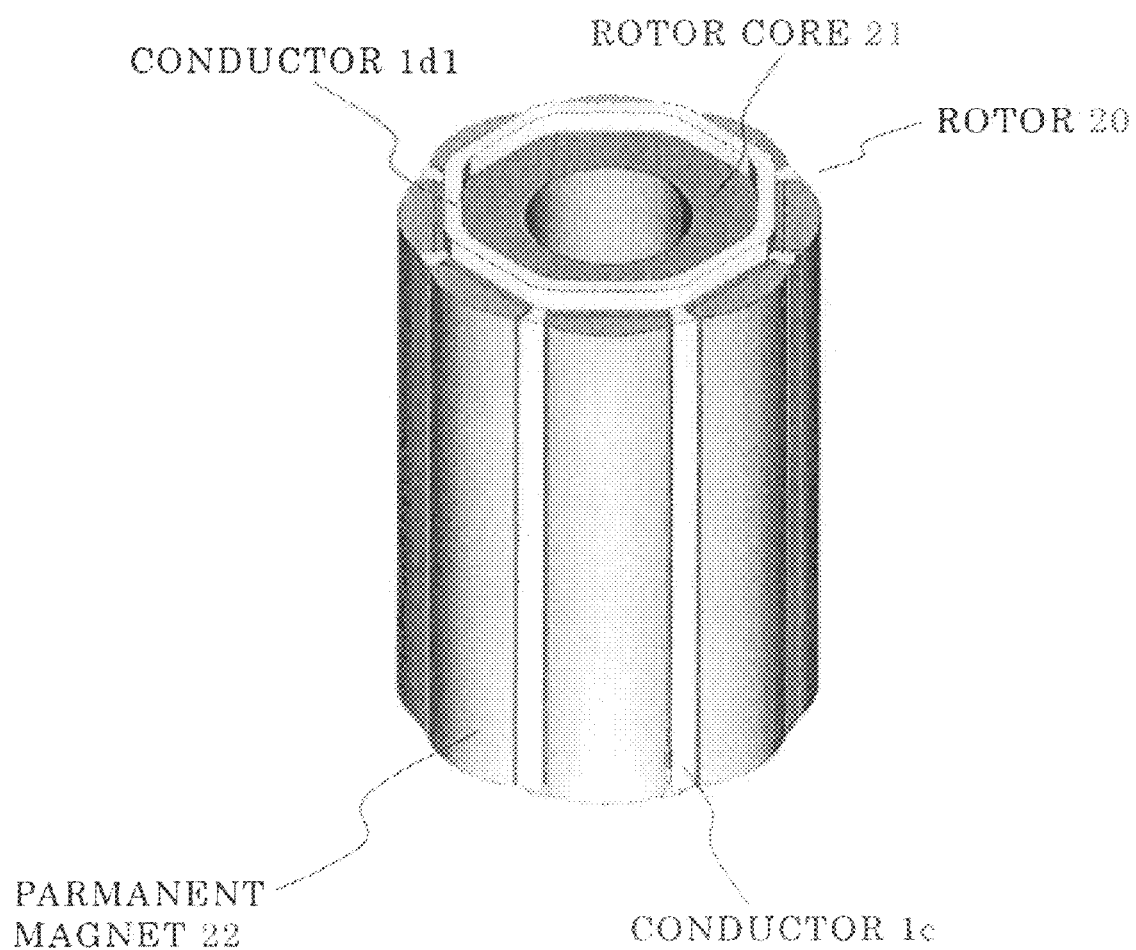
FIG. 23 is a perspective diagram illustrating a rotor of a motor according to the second embodiment of the present invention.

FIG. 23 is a perspective diagram of the rotor 20 of the motor according to the second embodiment of the present invention. The permanent magnets 22 are disposed on a surface of the rotor core 21 at equal intervals in a circumferential direction. Between the permanent magnets 22, the conductor 1c is disposed to extend in a direction parallel to a rotational axis. The conductor 1d1 is disposed for electrically interconnecting all the conductors 1c, and a conductor 1d2 (not shown) is disposed on an opposite side. The conductors 1d1 and 1d2 are end rings, and may be annular or polygonal conductors.

Figure 24:
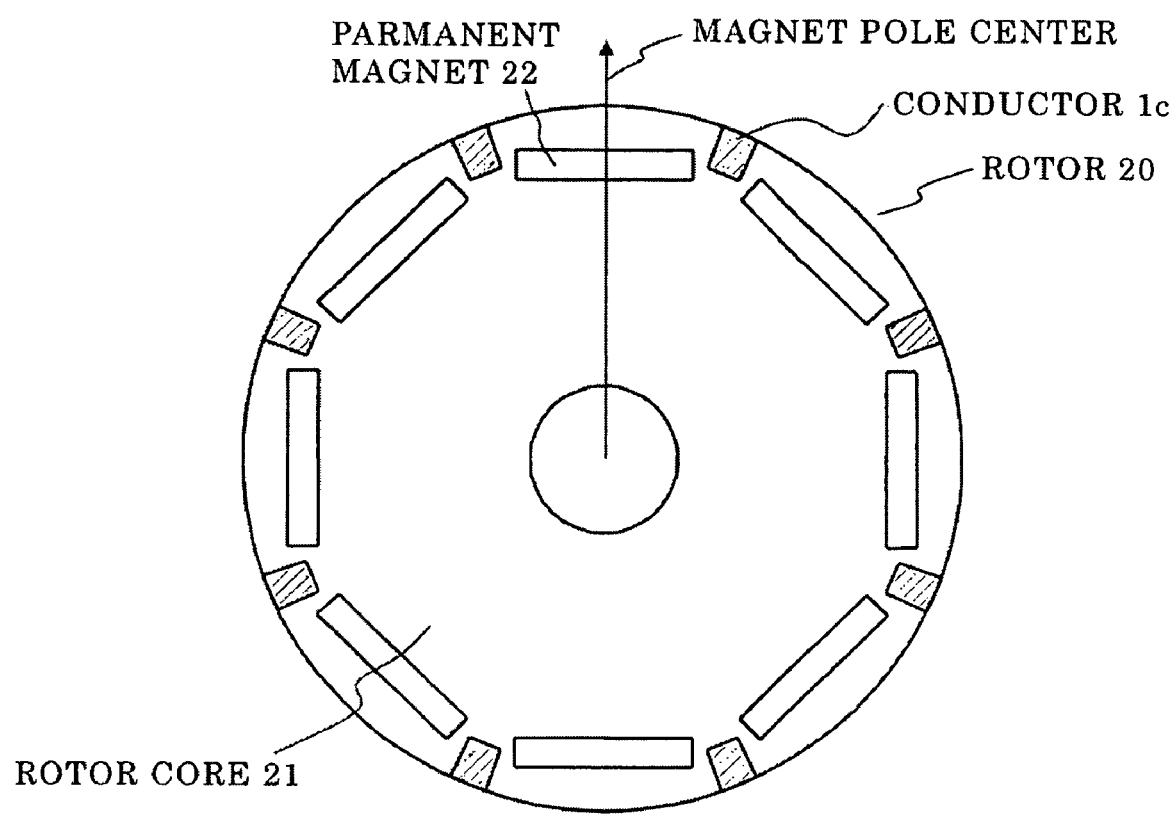
FIG. 24 is a diagram illustrating a rotor of a magnet-buried motor seen from a rotational axis direction according to the second embodiment of the present invention.

FIGS. 20 and 22 illustrate the examples of the surface magnetic type motor. However, the present invention can be applied to a magnet-buried type motor. FIG. 24 is a diagram illustrating the rotor 20 of the magnet-buried type motor seen from the rotational axis direction according to the second embodiment of the present invention, where the permanent magnets 22 are buried in the rotor core 21. Between the permanent magnets 22, the conductor 1c is disposed. This rotor 20 has eight poles, and the conductors 1c are disposed in eight places. The conductors 1c are all interconnected electrically by other conductive portions d1 and d2 (not shown).

Figure 25:
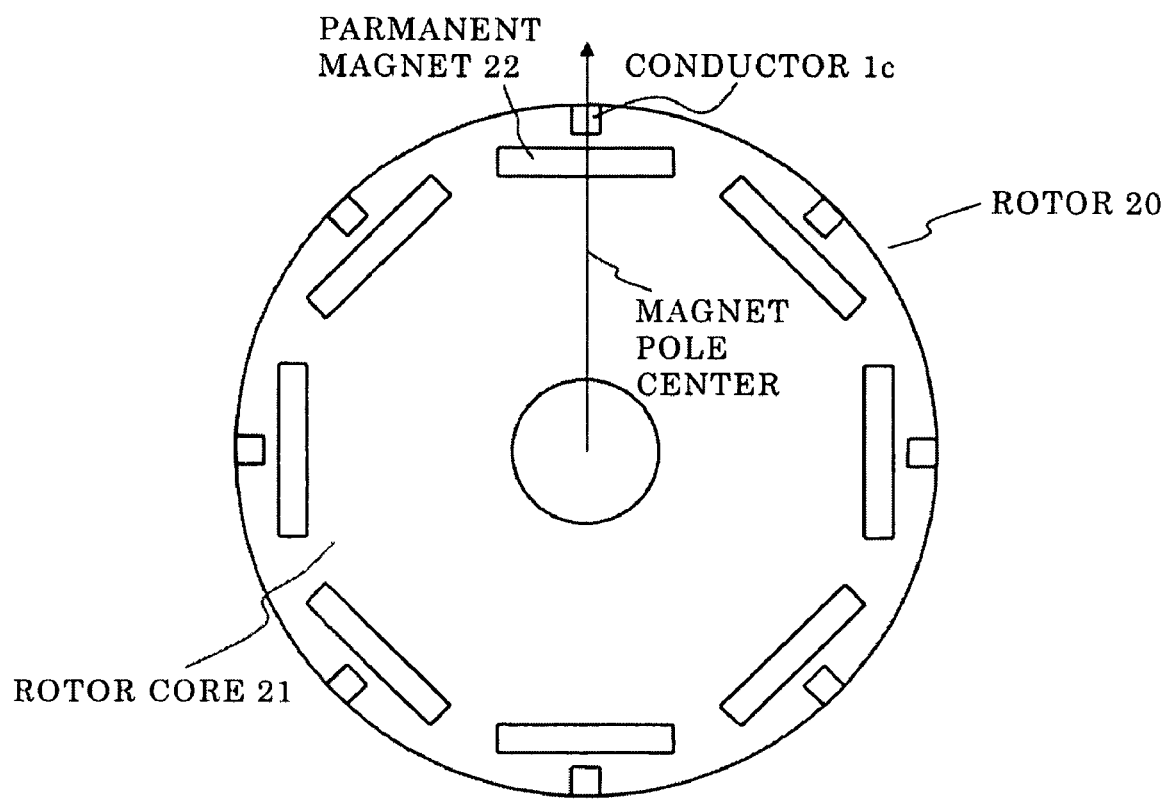
FIG. 25 is another diagram illustrating the rotor of the magnet-buried motor seen from the rotational axis direction according to the second embodiment of the present invention.

FIG. 25 is another diagram illustrating the rotor 20 of the magnet-buried type motor seen from the rotational axis direction according to the second embodiment of the present invention, where the conductor 1c is disposed near a magnetic pole center. As in the previous case, eight conductors 1c are electrically interconnected by the other conductive portions d1 and d2 (not shown).

Thus, impedance changes depending on rotor positions, enabling detection of a rotational angle. FIGS. 24 and 25 illustrate the examples where the conductors 1c are disposed between all the magnetic poles or in the magnetic pole center. However, the present invention is not limited to those cases. It is apparent that, even when the conductors 1c are disposed between a part of magnetic poles or a part of the magnetic pole center, a similar effect of changing impedance of the motor depending on positions of the rotor 20 is obtained.

When a high-frequency current is supplied to the motor having the configuration of the second embodiment, a current flowing through the armature winding 12 is subjected to dq conversion, with a d-axis current being indicated by an abscissa and a q-axis current being indicated by an ordinate, a Lissajous waveform can be obtained. Referring to FIGS. 15 and 16 used for description of the first embodiment, a Lissajous figure obtained by the second embodiment is described.

FIG. 15 shows the Lissajous waveform when a high-frequency waveform is supplied at no load. No conductor of the second embodiment is disposed. In the conventional surface magnet type motor, there are almost no saliency, nor almost no changes in impedance depending on positions of the rotor 20. Thus, a circular Lissajous waveform is drawn. However, in the case of the motor of the second embodiment, impedance is changed depending on positions of the rotor 20 by using flowing of the induced current through the conductors. Thus, an elliptic Lissajous waveform is drawn.

In the example of FIG. 15, a d-axis current is large, in other words, d-axis impedance is small. However, a configuration where q-axis impedance is small can conversely be employed. This configuration can be realized by disposing the conductors 1c near the magnetic pole center. In this case, an elliptic Lissajous waveform of a large q-axis current is drawn.

FIG. 16 shows the Lissajous waveform when a load current flows. When a load current flows, magnetic saturation of the core may cause inclination of a Lissajous waveform. Even in such a case, a rotor position can be estimated based on the load current and long-axis inclination of an ellipse. Thus, a rotational angle can be detected by measuring an armature current.

Thus, according to the second embodiment, even when the conductors disposed on the periphery of the permanent magnets are all interconnected electrically, effects similar to those of the first embodiment can be obtained. In other words, by using a phenomenon where a difference is generated between d-axis impedance and q-axis impedance when a high-frequency current is supplied to the armature winding, even without disposing any rotational angle detector such as an encoder or a resolver, a rotational angle can be detected by measuring an armature current. As a result, a structure of the permanent magnet dynamo-electric machine can be simplified, and miniaturization and low costs can be realized.

In the drawings of the second embodiment, holding of the permanent magnets 22 is omitted. However, even when there are members for holding the permanent magnets 22, similar effects can be obtained. For example, a stainless-steel tubular holding member may be disposed in an outer peripheral part of the permanent magnet 22. Moreover, irrespective of materials of the permanent magnets 22, similar effects can be obtained. For example, a ferritic magnet or a rare-earth permanent magnet such as a neodymium sintered magnet may be used.

Third Embodiment

A third embodiment is directed to a case where armature winding 12 is concentrated winding.

Figure 26:
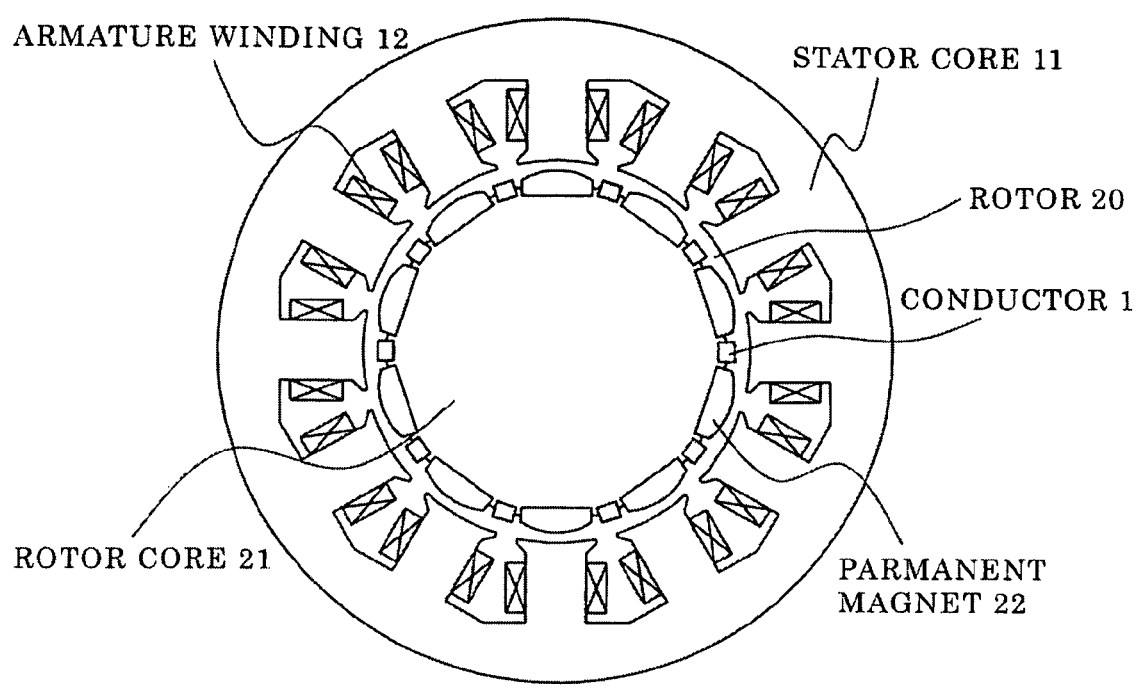
FIG. 26 is a cross-sectional diagram illustrating a permanent magnet dynamo-electric machine according to a third embodiment of the present invention.

FIG. 26 is a cross-sectional diagram illustrating a permanent magnet dynamo-electric machine according to the third embodiment of the present invention, where the armature winding 12 is concentrated winding. The stator 10 includes the stator core 11 and the armature winding 12. The armature winding 12 is concentratedly wound on the stator core 11. The rotor 20 includes the permanent magnets 22 and the rotor core 21, and the conductor 1 is disposed between the permanent magnets 22. In FIG. 26, the number of slots of the stator core 11 is 12, and the number of poles of the motor is 10.

The conductor disposed between the permanent magnets 22 extends in a direction almost parallel or parallel to a rotational axis direction. Other conductive portions (not shown) for electrically interconnecting those conductors are disposed. With this configuration, an induced current flowing through the conductors 1 causes changes in impedance depending on position of the rotor 20, enabling estimation of a rotational angle.

In the case of the surface magnet type motor, as compared with the magnet-buried type motor, cogging torque and torque ripples are smaller and saliency is also smaller. Thus, application of a method of applying a high frequency to detect a rotational angle is difficult. However, the configuration of the third embodiments can achieve both of "low cogging torque and low torque ripple" and "detection of a rotational angle".

Thus, according to the third embodiment, when the armature winding is concentrated winding, even in the surface magnet type motor, particularly, "low cogging torque and low torque ripple" and "detection of a rotational angle" can simultaneously be achieved.

The third embodiment is directed to the example of ten poles and twelve slots. However, the present invention is not limited to this example. When m is an integer of 1 or more, for example, a ratio of the number of poles with the number of slots may be in the following relations:

Number of poles:number of slots=10m:12m
Number of poles:number of slots=14m:12m
Number of poles:number of slots=10m:9m
Number of poles:number of slots=8m:9m
Number of poles:number of slots=2m:3m
Number of poles:number of slots=4m:3m Fourth Embodiment A fourth embodiment is directed to a case where the armature winding 12 is distributed winding.

Figure 27:
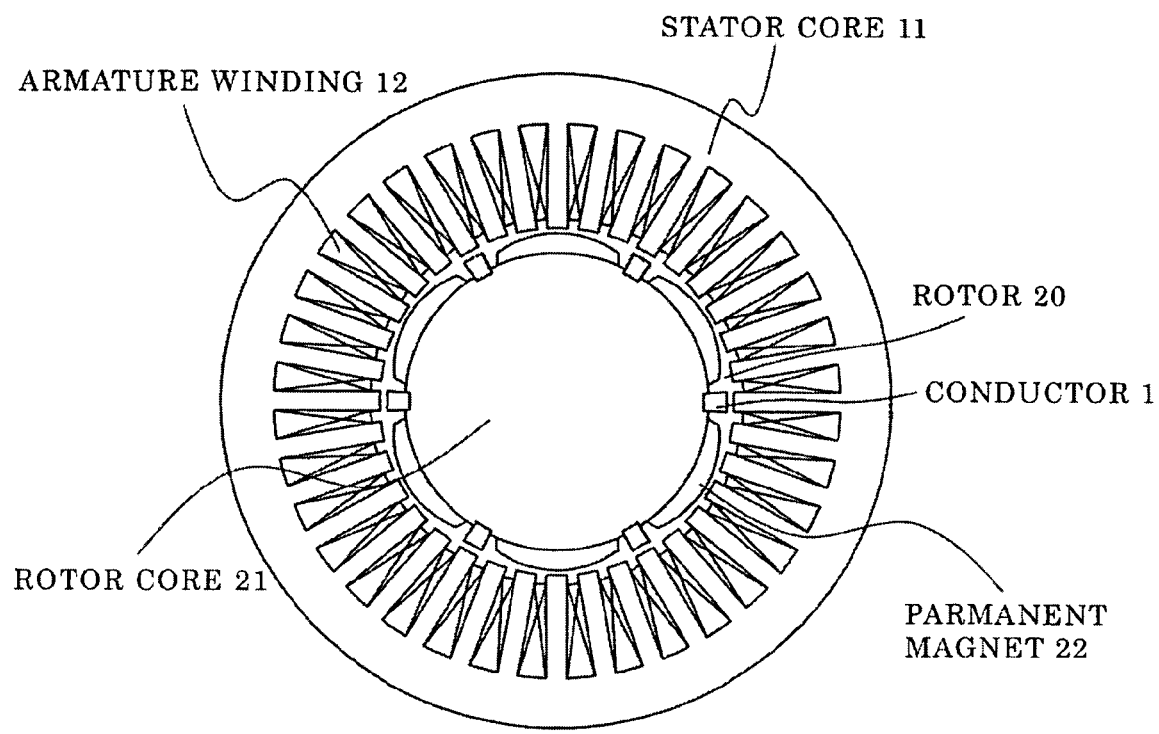
FIG. 27 is a cross-sectional diagram illustrating a permanent magnet dynamo-electric machine according to a fourth embodiment of the present invention.

FIG. 27 is a cross-sectional diagram illustrating a permanent magnet dynamo-electric machine according to the fourth embodiment of the present invention, which exemplifies a case where the armature winding 12 is distributed winding. The stator 10 includes the stator core 11 and the armature winding 12. The armature winding 12 is wound over a plurality of teeth of the stator core 11. The rotor 20 includes the permanent magnets 22 and the rotor core 21. Each of the conductors 1 is disposed between the permanent magnets 22. FIG. 27 illustrates an example in which the number of slots of the stator core 11 is 36, and the number of poles of the permanent magnet 22 is 6.

The conductor disposed between the permanent magnets 22 extends in a direction almost parallel to or parallel to a rotational axis direction. Other conductive portions (not shown) are disposed to electrically interconnect those conductors. With this configuration, an induced current flowing through the conductors 1 causes changes in impedance depending on a position of the rotor 20, enabling estimation of a rotational angle.

In the case of the surface magnet type motor, as compared with the magnet-buried type motor, cogging torque and torque ripples are smaller and saliency is also smaller. Thus, application of a method of applying a high frequency to detect a rotational angle is difficult. However, the configuration of fourth embodiment can achieve both of "low cogging torque and low torque ripple" and "detection of a rotational angle".

Thus, according to the fourth embodiment, when the armature winding is distributed winding, even in the surface magnet type motor, particularly, "low cogging torque and low torque ripple" and "detection of a rotational angle" can simultaneously be achieved.

The fourth embodiment is directed to the example of six poles and thirty-six slots. However, the present invention is not limited to this example. When m is an integer of 1 or more, for example, a ratio of the number of poles with the number of slots may be in the following relations:

Number of poles:number of slots=m:6m
Number of poles:number of slots=m:3m (for example, four poles and twelve slots, or six poles and eighteen slots)
Number of poles:number of slots=2m:9m (for example, four poles and eighteen slots, or six poles and twenty-seven slots)

Fifth Embodiment

Figure 28:
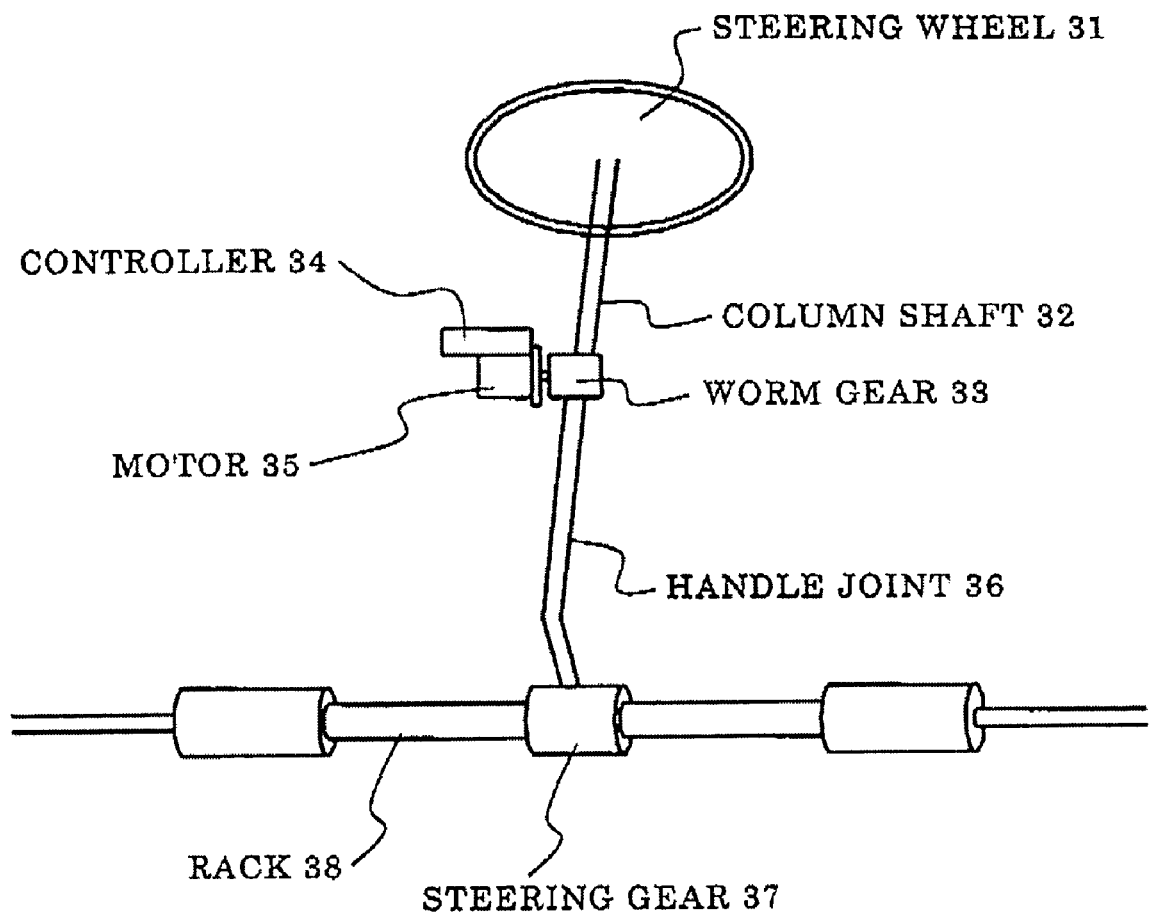
FIG. 28 is a schematic diagram illustrating a configuration of an electric power steering device according to a fifth embodiment of the present invention.

A fifth embodiment is described by way of a specific example in which rotational position detection according to the present invention is applied to an electric power steering device. FIG. 28 schematically illustrates a configuration of the electric power steering device according to the fifth embodiment of the present invention. The electric power steering device includes a column shaft 32 which is coupled with a steering wheel 31 to receive a steering force of the steering wheel 31. A worm gear 33 (FIG. 28 illustrates only a gear box, omitting its detailed description) is connected to the column shaft 32, and the steering force is transmitted to the worm gear 33.

The worm gear 33 transmits an output (torque or r.p.m.) of a motor 35 driven by a controller 34 by changing a rotational direction to a right angle and reducing rotation to add assist torque of the motor 35 to the steering force. The steering force is transmitted through a handle joint 36 connected to the worm gear 33 so that its direction is changed. A steering gear 37 (FIG. 28 illustrates only a gear box, omitting its detailed description) reduces rotation of the handle joint 36, and simultaneously converts the rotation into linear motion of a rack 38 to obtain required displacement. The linear motion of the rack 38 moves wheels to enable direction changing of a vehicle.

In such an electric power steering device, to properly drive the motor 35, a rotational angle has to be detected. Thus, the conventional motor includes a rotational angle detector such as a Hall sensor or a resolver. However, the presence of the Hall sensor or the resolver increases the number of components and costs. Besides, the motor size also increases because of the rotational angle detector.

However, by incorporating the motor 35 according to any one of the first to fourth embodiments of the present invention as described above in the electric power steering device, even without any rotational angle detector, a rotational angle can be detected by using an impedance difference generated by the induced current flowing through the conductors to measure an armature current. As a result, the number of components and costs can be reduced. Moreover, the motor 35 can be reduced in size and weight.

Figure 29:
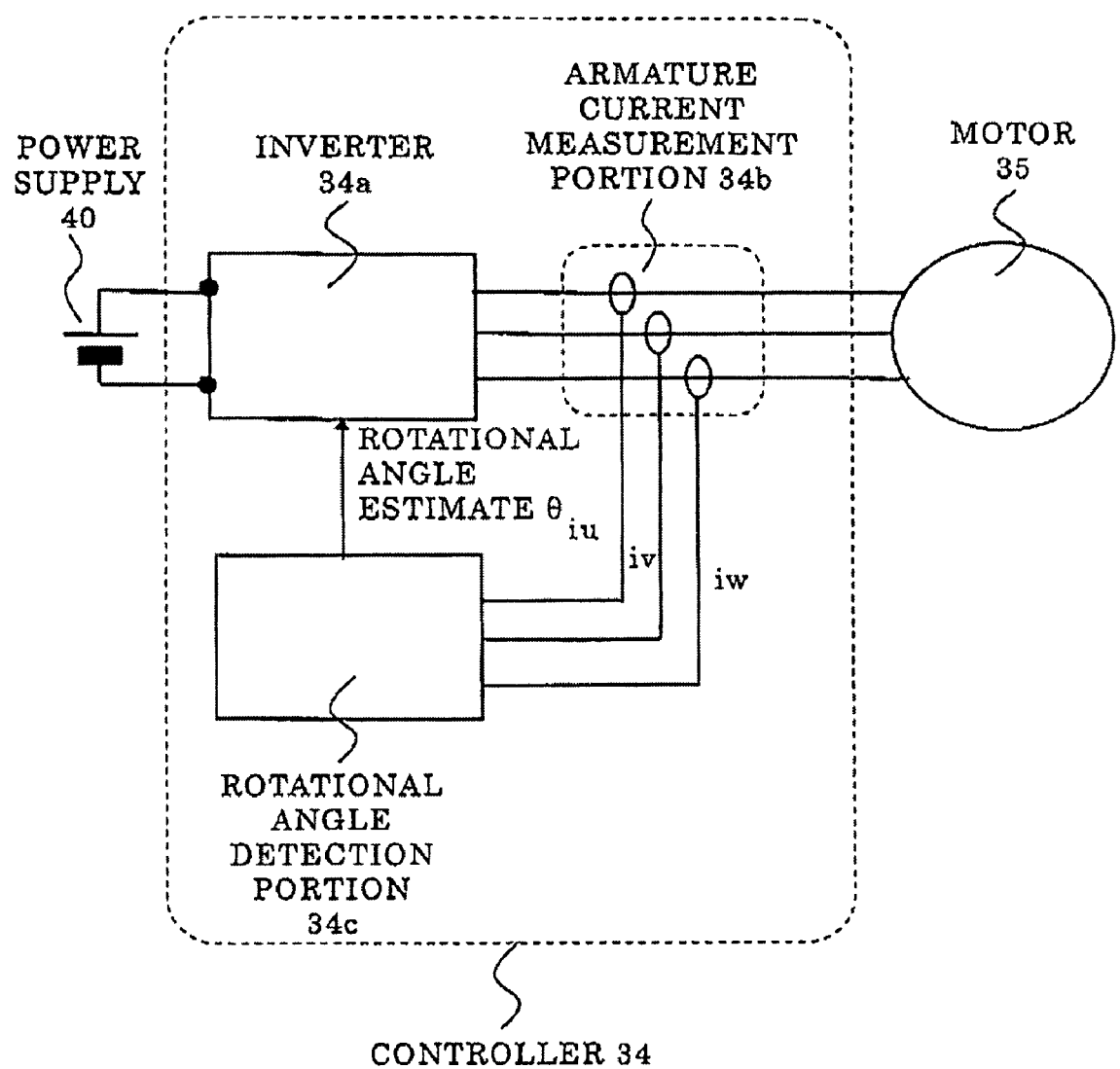
FIG. 29 is a configuration diagram of a rotational angle detector according to the fifth embodiment of the present invention.

FIG. 29 is a configuration diagram of a rotational angle detector according to the fifth embodiment of the present invention. A motor 35 is any one of the motors described above in the first to fourth embodiments. The motor 35 is connected to a controller 34. The controller 34 is further connected to a power supply 40. The power supply 40 is constituted by, for example, a DC power supply such as a battery. In this embodiment, the controller 34 and the motor 35 of FIG. 29 correspond to the controller 34 and the motor 35 of FIG. 28.

In FIG. 29, the controller 34 has, although its detailed configuration is omitted, an exemplary configuration including an inverter portion 34a, an armature current measurement portion 34b, and a rotational angle detection portion 34c. The inverter portion 34a supplies a current to the motor 35 to drive the motor 35 and also supplies a high frequency current of several hundreds of Hz to several tens of kHz as described above in the first embodiment to detect the rotational angle.

The armature current measurement portion 34b has a function of measuring the armature current and is constituted by, for example, a shunt resistor. FIG. 29 illustrates a configuration for measuring a three-phase current. However, a configuration for measuring a two-phase current or a one-phase current on the power supply side may also be adopted.

The current value measured by the armature current measurement portion 34b is input to the rotational angle detection portion 34c to be arithmetically processed. The rotational angle detection portion 34c determines a rotational angle estimate θ by, for example, determining a long-axis direction of an elliptic trajectory as illustrated in FIGS. 15 and 16 described above. The rotational angle estimate θ estimated by the rotational angle detection portion 34c is utilized to properly supply the current for driving the motor in the inverter portion.

With the conventional configuration, it has been necessary to separately provide a rotational angle detector such as a resolver or Hall sensor to drive the motor. However, with the configuration of FIG. 29, the rotational angle can be detected without a resolver or Hall sensor. When controlling torque of the motor 35, the current value needs to be known, and hence the armature current measurement portion 34b is also provided in the conventional configuration where the rotational angle is detected by a resolver or Hall sensor. Further, the rotational angle detection portion 34c can be constituted by a microprocessor or inside an ASIC, which are also provided in the conventional configuration. Thus, in the present invention, no additional component is added, the resolver or the Hall sensor can be eliminated, and the rotational angle can be detected with fewer components than in the conventional art.

In the electric power steering device as illustrated in FIG. 28 described above, cogging torque and torque ripples generated in the motor are transmitted to the steering wheel 31 via a gear such as the worm gear 33, and the column shaft 32. Thus, when the motor generates large cogging torque and torque ripples, smooth steering feelings cannot be obtained.

FIG. 28 illustrates the electric power steering device of a column assist type. However, also in an electric power steering device of a pinion assist type or rack assist type, cogging torque and torque ripples of the motor are similarly transmitted to the steering wheel via the gear. Thus, when large cogging torque and torque ripples are generated, as in the column assist type, smooth steering feelings cannot be obtained.

However, with the motor 35 according to the present invention, the rotational angle can be detected without a Hall sensor or resolver even when the motor is of the surface magnet type. Generally, the surface magnet type motor tends to generate smaller cogging torque and torque ripples as compared with the magnet-buried type motor having large saliency. With the motor 35 according to the present invention, the rotational angle can be detected also for the surface magnet type motor without a Hall sensor or resolver.

Thus, according to the fifth embodiment, by applying the rotational position detection means using the permanent magnet dynamo-electric machine according to the present invention to the electric power steering device, even for the surface magnet type motor, in addition to an effect of reducing the number of components, costs, the motor size and weight, an effect of "low cogging torque and low torque ripple" can be obtained.

What is claimed is:

1. A rotational angle detection device for a permanent magnet dynamo-electric machine comprising:
a stator that includes armature winding;
a rotor that includes a rotor core and a plurality of permanent magnets;
a conductive circuit, in which a torque is generated by a current of the armature winding, that includes first conductors extending in an axial direction of the rotor and being disposed in at least two places in a circumferential direction of the rotor, and second conductors for electrically interconnecting the first conductors, wherein,
the first conductors are each disposed to have a portion protrude from the rotor core outwardly in the diameter direction are each disposed within one of a range of an electrical angle between −45° and +45° in the circumferential direction with a magnetic pole center of each of the plurality of permanent magnets being set as a reference and a range of an electrical angle between −45° and +45° with a position apart from the magnetic pole center by an electrical angle of 90° being set as a reference, and
the conductive circuit is disposed in at least one place in the circumferential direction; and
means for detecting a rotational angle of the rotor by measuring a value of the current flowing through the armature winding.

2. The rotational angle detection device according to claim 1, wherein there are at least two conductive circuits, and a circumferential interval of the conductive circuits when disposed in at least two places is an electrical angle of 180×n°, where n is an integer of 1 or more.

3. The rotational angle detection device according to claim 1, wherein the conductive circuit is disposed so that a circumferential center of the conductive circuit substantially matches the magnetic pole center of each of the plurality of permanent magnets.

4. The rotational angle detection device according to claim 1, wherein the conductive circuit is disposed so that a circumferential center of the conductive circuit substantially matches a position apart from the magnetic pole center of each of the plurality of the permanent magnets by an electrical angle of 90°.

5. The rotational angle detection device according to claim 1, wherein there is an amount of plural conductive circuits that match an amount of plural poles of the permanent magnet dynamo-electric machine, and the conductive circuits are disposed at equal intervals in the circumferential direction.

6. The rotational angle detection device according to claim 1, wherein the second conductors are disposed at both ends of the rotor in the axial direction to electrically interconnect all the first conductors.

7. The rotational angle detection device according to claim 6, wherein the conductive circuit is disposed so that a circumferential position of each of the first conductors substantially matches the magnetic pole center of each of the plurality of permanent magnets.

8. The rotational angle detection device according to claim 6, wherein the conductive circuit is disposed so that a circumferential position of each of the first conductors substantially matches a position apart from the magnetic pole center of each of the plurality of the permanent magnets by an electrical angle of 90°.

9. The rotational angle detection device according to claim 6, wherein in the conductive circuit, the first conductors are disposed in M places, where M is the number of poles of the permanent magnet dynamo-electric machine, at intervals of an electrical angle of 180° in the circumferential direction, and the second conductors are disposed as end rings to electrically interconnect the first conductors.

10. The rotational angle detection device according to claim 9, wherein the end rings have a polygonal cross section.

11. The rotational angle detection device according to claim 1, wherein each of the plurality of permanent magnets is disposed on a surface of the rotor.

12. The rotational angle detection device according to claim 1, wherein each of the plurality of permanent magnets is disposed so as to be buried in the rotor core.

13. An electric power steering device comprising the permanent magnet dynamo-electric machine according to claim 1 and a gear.

14. The rotational angle detection device according to claim 1, wherein the first conductors protrude from the rotor core outwardly in a direction of a diameter of the rotor core.

15. The rotational angle detection device according to claim 1, wherein the armature winding is concentrated winding.

16. The rotational angle detection device according to claim 1, wherein the armature winding is distributed winding.

17. The rotational angle detection device according to claim 1, wherein the means for detecting outputs the rotational angle.

18. The rotational angle detection device according to claim 1, wherein the first conductors are buried in the rotor core.

19. A rotational angle detection device for a permanent magnet dynamo-electric machine comprising:
 a stator that includes armature winding;
 a rotor that includes a rotor core and a plurality of permanent magnets;
 a conductive circuit, in which a torque is generated by a current of the armature winding, that includes first conductors extending in an axial direction of the rotor and being disposed in at least two places in a circumferential direction of the rotor, and second conductors for electrically interconnecting the first conductors, wherein,
 the first conductors are each disposed to have a portion protrude from the rotor core outwardly in the diameter direction are each disposed within one of a range of an electrical angle between −45° and +45° in the circumferential direction with a magnetic pole center of each of the plurality of permanent magnets being set as a reference and a range of an electrical angle between −45° and +45° with a position apart from the magnetic pole center by an electrical angle of 90° being set as a reference, and the conductive circuit is disposed in at least one place in the circumferential direction; and
 a controller that detects a rotational angle of the rotor by measuring a value of the current flowing through the armature winding.

\* \* \* \* \*